United States Patent
Shinohara et al.

(10) Patent No.: US 6,740,383 B2
(45) Date of Patent: May 25, 2004

(54) MAGNETIC RECORDING MEDIUM POSSESSING A RATIO OF HC (PERPENDICULAR) TO HC(HORIZONTAL) THAT IS NOT MORE THAN 0.22 AND MAGNETIC RECORDING DISK DEVICE

(75) Inventors: Masayoshi Shinohara, Kawasaki (JP); Kenji Sato, Kawasaki (JP); Yuki Yoshida, Kawasaki (JP); Iwao Okamoto, Kawasaki (JP); Yasuji Ikeda, Kawasaki (JP); Kiyoshi Yamaguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/275,578

(22) Filed: Mar. 24, 1999

(65) Prior Publication Data

US 2002/0045069 A1 Apr. 18, 2002

(30) Foreign Application Priority Data

May 27, 1998 (JP) .......................... 10-145935

(51) Int. Cl.$^7$ .............................. G11B 5/73; G11B 5/64
(52) U.S. Cl. ...................... 428/65.3; 428/141; 428/216; 428/694 TS; 428/694 TR; 428/694 ST; 428/694 SG
(58) Field of Search ................ 428/65.3, 141, 428/694 T, 694 TS, 694 ST, 694 SG, 694 TR, 216

(56) References Cited

U.S. PATENT DOCUMENTS

| | | | | |
|---|---|---|---|---|
| 5,250,339 A | * | 10/1993 | Tani et al. ................. | 428/65.5 |
| 5,480,733 A | * | 1/1996 | Okumura et al. .......... | 428/336 |
| 5,815,343 A | * | 9/1998 | Ishikawa et al. ......... | 360/97.01 |
| 5,863,609 A | * | 1/1999 | Yamamoto .................. | 427/283 |
| 5,871,621 A | * | 2/1999 | Ross ....................... | 204/192.2 |
| 5,879,783 A | * | 3/1999 | Chang et al. ............... | 428/141 |
| 6,057,021 A | * | 5/2000 | Ishikawa et al. ............ | 360/128 |
| 6,071,607 A | * | 6/2000 | Okuyama et al. .......... | 428/332 |
| 6,120,890 A | * | 9/2000 | Chen et al. .............. | 204/192.2 |
| 6,361,859 B1 | * | 3/2002 | Cheng et al. ................ | 428/336 |
| 6,461,750 B1 | * | 10/2002 | Chen et al. .......... | 428/694 TM |

FOREIGN PATENT DOCUMENTS

| | | |
|---|---|---|
| JP | 61279925 | 9/1986 |
| JP | 63148411 | 6/1988 |

(List continued on next page.)

OTHER PUBLICATIONS

JPO Abstract Translation of JP 09-293227A (Clipped Image No. JP409293227A).*

*Primary Examiner*—Paul Thibodeau
*Assistant Examiner*—Kevin M Bernatz
(74) *Attorney, Agent, or Firm*—Greer, Burns & Crain, Ltd.

(57) ABSTRACT

A magnetic recording medium and a magnetic disk device using the same. The magnetic recording medium comprising a nonmagnetic substrate having applied thereon, through two or more chromium-based underlayers, a magnetic recording layer having a circumferential direction of easy magnetization and containing cobalt as a principal component thereof, and also containing chromium and platinum in combination with tantalum or tantalum and niobium. Using the magnetic recording medium, a reproducing output and S/N ratio can be increased without causing an increase in noise.

9 Claims, 8 Drawing Sheets

FOREIGN PATENT DOCUMENTS

| | | |
|---|---|---|
| JP | 4-28013 | 1/1992 |
| JP | 447520 | 2/1992 |
| JP | 489620 | 3/1992 |
| JP | 4117611 | 4/1992 |
| JP | 4321919 | 11/1992 |
| JP | 5-189758 | 7/1993 |
| JP | 5197941 | 8/1993 |
| JP | 5-205244 | 8/1993 |
| JP | 5314471 | 11/1993 |
| JP | 6215346 | 8/1994 |
| JP | 6259741 | 9/1994 |
| JP | 6267050 | 9/1994 |
| JP | 7021543 | 1/1995 |
| JP | 7050008 | 2/1995 |
| JP | 7050009 | 2/1995 |
| JP | 7093738 | 4/1995 |
| JP | 7272263 | 10/1995 |
| JP | 7307020 | 11/1995 |
| JP | 8007251 | 1/1996 |
| JP | 8124153 | 5/1996 |
| JP | 8212531 | 8/1996 |
| JP | 8273160 | 10/1996 |
| JP | 8329442 | 12/1996 |
| JP | 9007150 | 1/1997 |
| JP | 9147348 | 6/1997 |
| JP | 9265619 | 10/1997 |
| JP | 9-293227 | 11/1997 |
| JP | 10-74318 | 3/1998 |

\* cited by examiner

MAGNETIC RECORDING MEDIUM POSSESSING A RATIO OF HC (PERPENDICULAR) TO HC(HORIZONTAL) THAT IS NOT MORE THAN 0.22 AND MAGNETIC RECORDING DISK DEVICE

BACKGROUND OF THE INVENTION

1. Field of the Invention

The present invention relates to a magnetic recording medium and more particularly to a magnetic recording medium which enables high-density recording by virtue of a high coercive force and, particularly, can suppress an increase in noise or preferably can reduce noise, and also can improve a reproducing output and S/N ratio. The present invention also relates to a magnetic recording disk device, in brief, a magnetic disk device, for recording and reproducing information, using the magnetic recording medium of the present invention.

2. Description of Related Art

The development of information processing techniques has led to an increasing demand for an increase in the density of magnetic disk devices used in external storage devices for computers. Specifically, in the reproducing head of the magnetic disk devices, the use of a magnetoresistive head utilizing a magnetoresistor, wherein the electric resistance changes in response to the magnetic field intensity, that is, an MR head, instead of the conventional wound-type inductive thin film magnetic head has been proposed in the art. The MR head applies magnetoresistance, that is, the change in electric resistance produced in a magnetic material on application of an external magnetic field, to the reproduction of a signal on a recording medium and has features including a reproduction output margin that is several times larger than that of the conventional inductive thin film magnetic head, a low inductance and a large S/N ratio. Further, the use of an AMR (anisotropic magnetoresistive) head utilizing anisotropic magnetoresistance, a GMR (giant magnetoresistive) head utilizing giant magnetoresistance, and a spin valve GMR head of a practical type, besides the MR head, have also been proposed.

Further, in order to meet the demand for high density recording, a sufficient improvement in properties, to cope with the above MR head, AMR head, or GMR head (including spin valve head) has been demanded of the magnetic recording medium. In particular, low noise is required in the magnetic recording medium, in addition to a high coercive force Hc for high-density recording.

Hitherto, as is well-known in the art, the magnetic recording medium has been generally produced by depositing chrominium on a nonmagnetic substrate such as an aluminum substrate to form an underlayer, followed by depositing a cobalt-based alloy on the resulting chromium underlayer to form a magnetic recording layer.

Further, to obtain a reduced noise level, many changes, such as the addition of an additional element to the alloy of the magnetic recording layer, thereby breaking the magnetic interaction between the magnetic particles or reduction in the particle size of the magnetic particles in the magnetic recording layer, have been made to the magnetic recording medium. For example, Japanese Unexamined Patent Publication (Kokai) No. 63-148411 discloses a low noise and high density recording-type magnetic recording medium which is suitable for use in high density recording devices. The magnetic recording medium disclosed in this publication is characterized in that the Co/Ni-based alloy or Co/Cr-based alloy constituting the magnetic recording layer contains a third element added thereto, that is, any one of Ta, Mo and W or an alloy thereof. Japanese Unexamined Patent Publication (Kokai) No. 7-50008 discloses a magnetic recording medium which can simultaneously satisfy the requirements of a high coercive force and low noise. Specifically, the magnetic recording medium disclosed in this publication comprises a nonmagnetic substrate layer and a magnetic layer deposited through a nonmagnetic metal underlayer (thickness of 10 to 300 nm) of chromium or a chromium alloy on the nonmagnetic substrate layer, the magnetic layer being formed of an alloy containing Co, Cr, Pt, and at least one member selected from the group consisting of Nb, Hf, W, Ti, and Ta. According to this invention, not only a high coercive force of 1,610 to 1,750 Oe (Examples 1 to 7) but also low noise can be achieved. Similarly, Japanese Unexamined Patent Publication (Kokai) No. 7-50009 discloses a magnetic recording medium wherein a thin film medium of an alloy of 95 to 60 at % of Cr and 5 to 40 at % of at least one member selected from Mo and W is used as an underlayer for a single magnetic layer consisting of a CoCrPt alloy. This magnetic recording medium also can realize, simultaneously, a high coercive force and low noise. More specifically, the use of a Cr underlayer containing 28 at % of Mo results in about 10% reduction in noise as compared with the underlayer consisting of Cr alone. In the techniques disclosed in these publications, however, tBr (a product of the layer thickness t and the residual magnetic flux density Br of the magnetic recording layer) is not less than 270 G.$\mu$m, rendering these techniques unsatisfactory for the higher density recording expected in the future.

Furthermore, recently, since the magnetic disk devices are carried for business and other uses, a glass substrate is frequently used in place of the aluminum substrate to improve a resistance to shock of the devices. For example, Japanese Unexamined Patent Publication (Kokai) No. 5-197941 discloses a thin metallic layer-type magnetic recording medium characterized by depositing, on a nonmagnetic glass substrate, a nonmagnetic heat storage layer having good heat conductivity (Cr, Ti or CrTi alloy) and a NiP layer in the described order, followed by forming a magnetic recording layer of Co alloy through an applied Cr underlayer. According to this invention, since a nonmagnetic heat storage layer having good heat conductivity is deposited at a large thickness of 300 to 1500 Å under the-NiP layer, a crystallization of NiP due to sudden increase of the temperature of the NiP layer during heating of the same layer at a temperature of 250 to 300° C. on a heating device such as an IR heater can be prevented and, as a function thereof, an undesirable reduction of the coercive force of the Co alloy can also be prevented. Moreover, Japanese Unexamined Patent Publication (Kokai) No. 5-314471 discloses a substrate for use in a magnetic recording medium characterized by having a nonmagnetic NiP layer having a surface roughness, in terms of a maximum height (R max), of 500 Å or less, produced upon electroless plating, on a glass substrate having a surface roughness, in terms of a maximum height (R max), of 500 Å or less. According to this invention, a magnetic recording medium having excellent durability due to use of the glass substrate and excellent corrosion resistance due to application of the electroless plating layer can be provided.

In this connection, the inventors have measured the read/write performances for the above-discussed magnetic recording media and other conventional magnetic recording media using a glass substrate as the nonmagnetic substrate, and found that sufficiently high read/write performances cannot be attained when the recording density is the level required at present, that is, generally 1 Gb/in$^2$ or more. In other words, for these magnetic recording media, it becomes possible to obtain low noise but it is difficult to avoid drawbacks which are caused simultaneously, such as a reduction of reproducing output. It is therefore desirable to ensure a remarkable reduction of noise in the media, i.e., highly increased S/N ratio, while maintaining a high reproducing output.

The related prior art will be further described in connection with the above descriptions. In the magnetic recording medium, a nonmagnetic underlayer to be sandwiched between the nonmagnetic substrate and the magnetic recording layer is generally constituted from chromium or an alloy thereof. This is because, if the chromium-based material is used as the underlayer material, it can adjust a direction of easy magnetization in the overlying magnetic recording layer consisting of a cobalt-based alloy to an areal direction. In fact, it is well-known that the underlayer is preferably formed from chromium alone or an alloy of two or more components containing chromium as a principal component thereof. However, the inventors have found that for the prior art magnetic recording media using a glass substrate, the conventional chromium-based underlayer used therein can cause an unusual increase of noise which means that a good SIN ratio cannot be obtained.

In addition, it is also well-known that a so-called "texture" or "texturing" may be applied to an aluminum substrate provided with a nonmagnetic NiP plating surface which is widely used in the production of prior art magnetic recording media to further orient a direction of easy magnetization of the magnetic layer to a circumferential direction, thereby increasing a S/N ratio of the medium. However, the experiments by the inventors have indicated that the texturing in a surface of the glass substrate does not create a magnetic anisotropy in the circumferential direction, contrary to the above-described texturing in the aluminum substrate.

Also, it is well-known that the texturing is effective to reduce an adsorption of the head onto the magnetic recording medium. However, in the prior art, the application of texturing to a surface of the glass substrate has not been practiced due to its low processability. As an alternative, there is a well-known method to laminate an irregular film, called a film texture, onto a surface of the glass substrate. However, the lamination of the film texture can deteriorate an areal orientation of the magnetic layer. Other texturing methods are also known to cause an increase of the grain size in the magnetic layer, thus lowering a S/N ratio of the medium.

In addition to the prevention of adsorption between the recording medium and the recording head, the texturing is also effective to reduce frictional force on a surface of the medium, because fine irregularities (depressions and projections) can be given to the medium surface. That is, in the magnetic recording disk device based on a CSS system, the recording head and the recording medium are in close contact with each other when the device is stopped, and then, when the device is again operated, a certain level of frictional force is generated between the head and the medium. Such frictional force can be reduced due to presence of the irregularities in the medium surface.

As described above, recently, there is a tendency to use a hard glass substrate in place of the aluminum substrate to satisfy the requirements concerning a high resistance to shock or impact, because the medium is generally used under the severe conditions in portable terminals of the magnetic disk device and the device itself has high performances which can be deteriorated by incorrect handling of the device. And, in view of the difficulty in the fabrication of fine irregularities in the glass substrate, methods other than the above-described film texture method have been adopted in the production of magnetic recording medium. Typical examples of the irregularity-providing methods are:

tape texturing in which a substrate is rotated with application of an alumina grain-coated polishing tape to produce circumferential grooves in a surface of the substrate;

slurry texturing in which a pad with the impregnated polishing solution containing alumina or diamond powders is pressed against a substrate to produce circumferential grooves in a surface thereof;

application of an irregularity-providing layer made from aluminum, titanium and the like to a substrate surface; and NiP plating on an aluminum substrate, thereby increasing a strength of the substrate.

However, the last method, i.e., NiP plating, is unsatisfactory, because as previously mentioned, the magnetic recording medium with the NiP-plated aluminum substrate does not ensure a high impact resistance necessary for high performance devices which will be developed in the future. Further, even if a hard substrate is used in view of obtaining a high impact resistance, the first or second method, i.e., tape texturing or slurry texturing, is insufficient to obtain a satisfactory surface roughness because of the low processability of the hard substrate. Thus, for the hard substrate, the third method, i.e., application of an irregularities-providing layer, is principally utilized. However, the resulting medium cannot be applied for use in combination with a SFS (stiction-free slider) head due to unacceptably large wearing amount of the pad of the SFS head. Therefore, it is required to develop both a new recording head and a new recording medium which can satisfy the requirement of a low recording head flying height of not more than 25 nm. Apparently, all of the above-described problems cannot be neglected in the production of magnetic disk devices having a high reliability. Accordingly, although a hard substrate shows poor processability, it is desired to enable use of such a hard substrate, with the advantages that the conventional production process can be used to form uniform irregularities on a substrate surface, thereby avoiding any problems with the low flying recording head, and also the impact resistance of the medium can be improved.

SUMMARY OF THE INVENTION

The objects of the present invention are directed to solving the many problems which were described above with reference to the prior art magnetic recording media and devices.

A first object of the present invention is therefore to provide a magnetic recording medium, particularly a longitudinal magnetic recording medium, which has a nonmagnetic substrate consisting of glass or silicon and having a surface with irregularities sufficient to show a low adsorptivity, and which exhibits a high coercive force thereby ensuring a high reproducing output, and inhibits an increase in noise or, preferably, reduces noise, and also which can improve a resolution of the reproduced output and the S/N ratio.

In the magnetic recording medium as the target of the present invention, one of the resulting properties is defined referring to a S/N ratio of the medium when the medium is used at the recording density of 1 Gb/in$^2$ or more, and the S/N ratio should be at least 20 dB.

A second object of the present invention is to provide a magnetic recording disk device using the specific magnetic recording medium according to the present invention.

The above-described and other objects of the present invention will be easily understood from the following detailed description of the present invention.

In one aspect thereof, the present invention provides a magnetic recording medium comprising a nonmagnetic glass or silicon substrate having non-oriented irregularities on a surface thereof, and, having applied thereon in the following order:

an underlayer which comprises a second underlayer consisting of nickel (Ni) and phosphorus (P) and a third underlayer containing chromium (Cr) as a principal component thereof which are formed in the described order, in the presence or absence of a first underlayer containing chromium (Cr) as a principal component thereof, on said substrate, and a magnetic recording layer which has a circumferential direction of easy magnetization and contains cobalt (Co) as a principal component thereof, and also contains chromium (Cr) and platinum (Pt) in combination with tantalum (Ta) or tantalum (Ta) and niobium (Nb).

In the magnetic recording medium of the present invention, the underlayer between the nonmagnetic substrate and the magnetic recording layer may be either a two layer structure consisting of the second NiP underlayer and the third Cr-based underlayer, or a three layer structure consisting of the first Cr-based underlayer, the second NiP underlayer and the third Cr-based underlayer.

According to the present invention, because of its specific layer structure mentioned above, a magnetic recording medium having no adsorption problem and showing remarkably reduced noise can be provided. Further, contrary to the prior art which texturing in a surface of the glass or silicon substrate was not practically carried out due to poor processability, according to the present invention, such texturing can be advantageously applied to the glass or silicon substrate, as in application to other conventional substrates, because a NiP layer is applied over a surface of the substrate. Furthermore, according to the present invention, a magnetic recording medium showing a highly increased S/N ratio can be provided, if the magnetic recording layer is constituted from the specific-four-component alloy of Co, Cr, Pt and Ta or the specific five-component alloy of Co, Cr, Pt, Ta and Nb.

In addition, the inventors have found that in the lamination of the NiP layer over a surface of the glass or silicon substrate, the formation of a Cr-based layer over the substrate surface, followed by lamination of the NiP layer is particularly suited to the practice of the present invention. Described in detail, when a Cr layer (underlayer) and a CoCr-based magnetic recording layer are directly applied in the described order over the substrate such as glass or silicon substrate, a poor longitudinal or areal orientation of C-axis is observed in a hcp phase of the Co crystal in the magnetic layer, if a Cr concentration in the layer is 15 at % or more. An increase of the thickness of the Cr layer is effective to improve the longitudinal orientation, however, it causes an increase of the grain size of the Cr layer and thus the overlying CoCr-based magnetic layer. An increase in the noise in the medium is thus caused as a result of the increased grain size in these two layers. The inventors have studied the above problem, and have now found that the formation of coarse grains in the magnetic layer can be effectively prevented and thus an increase of the noise can be prevented, if a sputtered NiP layer is sandwiched between the substrate and the Cr layer. The inventors have also found that in the application of the NiP layer, the above-described order of the steps, i.e., formation of the Cr layer, followed by formation of the NiP layer, is effective to increase an adhesion between the substrate surface and the NiP layer.

In a preferred embodiment of the present invention, the present invention resides in a magnetic recording medium comprising a nonmagnetic substrate having applied thereon, through an underlayer, a magnetic recording layer, in which the underlayer comprises a second underlayer of the nickel alloy which is formed with sputtering on the substrate and is subjected to texturing. Preferably, the second underlayer further comprises a third chromium-based underlayer thereon.

In another aspect thereof, the present invention provides a magnetic recording disk device comprising a recording head section for recording information in a magnetic recording medium and a reproducing head section for reproducing information, wherein the magnetic recording medium is the magnetic recording medium of the present invention described above and described below in detail and the reproducing head section is provided with a magnetoresistive head.

The magnetoresistive head used in the magnetic disk device of the present invention preferably includes the MR head, the AMR head, the GMR head and the spin valve GMR head, because these heads can be operated with high performances. Further, the magnetoresistive head is preferably disposed on a stiction-free slider (SFS) which contains rails for creating a flying force wherein two or more projections or protrusions are disposed on a flying surface of the rails to prevent stiction. In other words, in the practice of the present invention, the magnetic recording medium of the present invention is preferably used in combination with the flying type magnetoresistive head provided with a slider containing stiction-preventing protrusions on a flying surface of the appended rails.

As will be appreciated from the following detailed description of the present invention, according to the present invention, the magnetic recording medium having a higher reproducing output and lower noise in comparison with the prior art magnetic recording media can be provided. Thus, the present invention ensures a higher S/N ratio at the high density recording, thereby providing a magnetic recording disk device for high density recording which is better than the prior art disk devices.

In addition to the above advantages, according to the present invention, an undesirable increase in noise can be prevented and, preferably, noise can be remarkably reduced, while enabling use of a hard substrate such as glass or silicon substrate without causing any texturing and other problems.

DESCRIPTION OF THE PREFERRED EMBODIMENTS

The present invention will be further described with reference to preferred embodiments thereof.

The magnetic recording medium according to the present invention comprises a nonmagnetic substrate and a magnetic recording layer of a magnetic metal material applied through an underlayer on the substrate, and may have a variety of layer structures within the range of the present invention.

Figure 1:
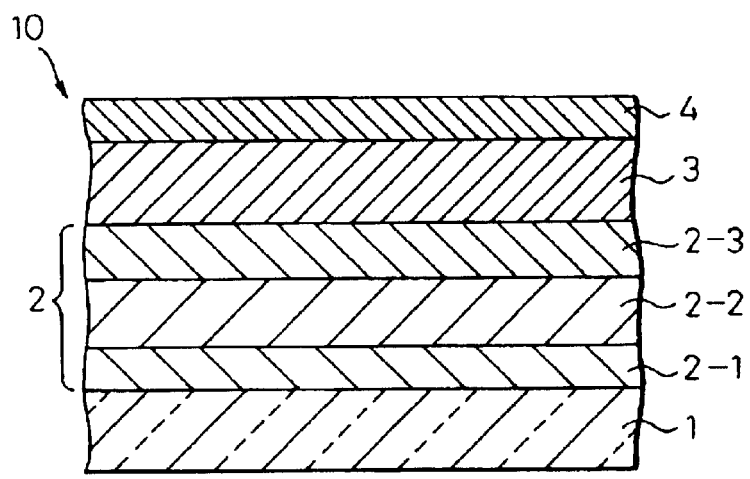
FIG. 1 is a cross-sectional view illustrating one preferred embodiment of the magnetic recording medium according to the present invention.

One preferred embodiment of the magnetic recording medium of the present invention is illustrated in FIG. 1 in which a nonmagnetic recording medium 10 is so constituted that a magnetic recording layer 3 of a magnetic metal material is disposed through an underlayer 2 over a nonmagnetic substrate 1. The substrate 1 is a glass substrate, and its surface has non-oriented irregularities, i.e., recesses and protrusions. A silicon substrate may be used in place of the glass substrate. Note, however, that the present invention will be described hereinafter in detail with reference to use of the "glass substrate". As is illustrated, the underlayer 2 has a three-layered structure, and is constituted from a first underlayer 2-1 containing chromium as a principal component, a second underlayer 2—2 consisting of nickel and phosphorus (NiP) and a third underlayer 2-3 containing chromium as a principal component. In the three-layered structure, the first underlayer 2-1 can act as an adhesion-promoting layer and therefore it may be omitted from the underlayer, if such function is obtained in the absence of such an under layer. Further, as is described hereinafter in detail, the magnetic layer 3 has a direction of easy magnetization in its circumferential direction, and is made from an alloy which contains cobalt (Co) as a principal component, along with chromium (Cr) and platinum (Pt) as well as tantalum (Ta) or tantalum (Ta) and niobium (Nb). Furthermore, in the illustrated medium 10, a protective layer 4 is applied as an uppermost layer. The protective layer 4 is preferably formed from carbon or diamondlike carbon (DLC), for example.

In the magnetic recording medium of the present invention, the nonmagnetic substrate used as a base body of the present invention is characterized by being a glass or silicon substrate having non-oriented irregularities. The glass substrate may be suitably selected from the glass substrates which are conventional in the field of magnetic recording. Examples of suitable glass substrates include, but are not restricted to, a soda lime glass substrate, a non-alkali glass substrate, a crystallized glass substrate and the like. The glass substrate used herein is required to have non-oriented irregularities on a surface thereof, and the formation of such irregularities on the substrate surface may be preferably carried out by etching with a hydrofluoric acid and the like. Similarly, the silicon substrate used herein may be a conventional one.

Further, the glass and silicon substrates can be advantageously used after cleaning their surface. For example, a surface of the glass substrate may be cleaned in accordance with any conventional cleaning methods. As the cleaning method, a degreasing step using an extra pure water, alkaline washing agent or neutral cleaner or a washing step using a deionized water may be used alone or in combination. In addition to the above degreasing and cleaning steps, a surface of the substrate may be subjected to an activation treatment, if desired.

Preferably, the substrate is used in the form of a disk. The size of the disk is not restricted to the specific one, because it may be widely varied depending upon the details of the medium and the desired results.

In the magnetic recording medium of the present invention, the underlayer sandwiched between the glass or silicon substrate and the magnetic recording layer is constituted from a first underlayer based on chromium which may be omitted if desired, a second underlayer consisting of nickel and phosphorus (NiP) which is applied directly or through the first underlayer to the substrate, and a third underlayer based on chromium.

The first underlayer is particularly applied to improve an adhesion of the second underlayer, i.e., the NiP layer, to the glass or silicon substrate. Therefore, if a satisfactory adhesion could be obtained in the absence of the first layer, the first layer may be omitted from the underlayer structure. However, the presence of the first underlayer is desirable, because it ensures highly improved and strong adhesion of the NiP layer to the substrate. Generally, the first underlayer may be formed from only chromium or, alternatively, it may be formed from an alloy of chromium and other metal(s), as is conventional in the field of magnetic recording. The alloy suitable for the formation of the second underlayer includes CrW, CrV, CrTi, CrMo and others. It is particularly preferred that the first underlayer is formed from a CrMo alloy, because, for example, the addition of Mo to Cr widens the lattice spacing of the first underlayer so that the widened lattice spacing can approach the lattice spacing of the overlying magnetic recording layer (CoCrPt-based alloy) which is widened depending upon the composition of the magnetic recording layer, particularly the Pt content, thereby accelerating a preferential longitudinal orientation for the C-axis of the magnetic recording layer.

The first underlayer is preferably formed in accordance with a sputtering method such as magnetron sputtering method under conventional sputtering conditions. Especially, to obtain a highly increased coercive force, it is preferred to carry out the sputtering process under the application of a negative DC bias. Suitable sputtering conditions include, for example, a temperature of about 100 to 300° C., argon (Ar) gas pressure of about 1 to 10 mTorr and negative DC bias of about 100 to 300V. If desired, in place of the sputtering method, other layer-forming methods such as vapor deposition and ion beam sputtering may be used. The layer thickness of the first underlayer may be widely varied depending upon the desired improvement of adhesion, and preferably it is in the range of about 5 to 25 nm.

The second underlayer is constituted from NiP, and this is the specific feature of the present invention. The NiP underlayer is generally formed at a relatively large thickness by an electroless plating, however, contrary to this, according to the present invention, the NiP underlayer is formed as a thin layer by sputtering. For example, since the thin NiP underlayer can exactly reproduce the irregularities of the substrate surface, it can introduce the remarkable effects such as improvement in the travelling or running of the head and the adhesion of the head to the medium and generation of an anisotropy. Further, since it has a small surface roughness, the NiP underlayer can introduce another effect such as reduction in the flying height of the head, when it is particularly used in combination with the magnetic head with protrusions.

The NiP underlayer is preferably formed in accordance with a sputtering method such as magnetron sputtering method under conventional sputtering conditions. Especially, to obtain a highly increased coercive force, it is preferred to carry out the sputtering process under the application of a negative DC bias. Suitable sputtering conditions include, for example, a temperature of about 100 to 250° C., argon (Ar) gas pressure of about 1 to 10 mTorr and negative DC bias of about 100 to 300V. During the formation of the NiP underlayer, a crystallization of NiP can be prevented, because the sputtering process is carried out under a relatively low temperature of not more than 250° C. The layer thickness of the NiP underlayer may be widely varied depending upon various factors, and preferably is in the range of about 5 to 100 nm in view of increase of a S/N ratio. A layer thickness below 5 nm will produce only insufficient magnetic characteristics, and a layer thickness above 100 nm will a tend to increase the noise.

In the NiP underlayer, a ratio (at %) of nickel (Ni) and phosphorus (P) constituting the underlayer may be varied depending upon the desired effects and other factors, however, it is particularly preferred that a ratio of Ni and P (Ni:P) be in the range of about (67 to 85):(33 to 15). In other words, a content (concentration) of P in the NiP underlayer is preferably about 15 to 33 at %. The lower limit of the P concentration in the NiP underlayer is 15 at % at which the NiP underlayer can substantially show a non-magnetic property, since the NiP underlayer should have a non-magnetic property to avoid any problems in the magnetic recording. The NIP alloy may have different forms, and when the NiP alloy in the form of a crystalline body is considered, the NiP alloy with the highest P concentration is $Ni_3P$ which is known to be a non-magnetic material. Further, it is also known that NiP can be in the form of art amorphous structure, if the P concentration is in the range of 15 to 26 at %. Note, in this connection, that the NiP layer in an amorphous form has substantially a non-magnetic property, but, if the P concentration is reduced to below 15 at %, a magnetic property is produced in the NiP layer as a result of deposition of a Ni layer. The upper limit of the P concentration in the NiP underlayer is 33 at %, because if the P concentration is increased to above 33 at %, there is no target NiP sufficient to satisfy the sputtering process. That is, the NiP target material containing an increased amount of P is brittle and therefore it cannot be fabricated to a hard NiP target having a high purity.

The NiP underlayer as the second underlayer is formed as a thin layer, as described above. For the prior art magnetic recording medium, the NiP underlayer has been generally utilized without subjecting it to a texturing process, if it has a small thickness. However, for the specific magnetic recording medium according to the present invention, it is preferred that the texturing process is applied to a surface of the NiP underlayer, prior to formation of the third underlayer thereon. That is, the NiP underlayer is preferably used after formation of circumferentially distributed small stripe-like ridges and grooves (irregularities) on a surface thereof. In particular, it is preferred that the NiP underlayer has been subjected to the texturing process so that it has the following surface roughness: surface roughness $Ra_1$ in a circumferential direction of less than 1 nm, and surface roughness $Ra_2$ in a radial direction of less than 2 nm, the roughness $Ra_1$ being smaller than the roughness $Ra_2$. In other words, the above-recited range of the surface roughness means that the grooves of the textured NiP underlayer have a depth sufficient to avoid a complete filling of the grooves with a lubricant after the lubricant is applied to the NiP underlayer.

The texturing process on a surface of the NiP underlayer can be mechanically carried out by using any one of texturing methods which are conventional in the production of the magnetic recording medium. Suitable texturing process includes, for example, polishing of the underlayer surface with a polishing means such as a grinding store tape or free abrasive grains.

In the magnetic recording medium of the present invention, a magnetic recording layer is applied after a third underlayer based-on chromium was formed. The third underlayer consisting of chromium as a principal component thereof may be constituted as in the above-described first underlayer based on chromium. That is, the third underlayer is advantageously formed from a metal material consisting of only chromium or a metal material comprising chromium and molybdenum as the principal components. Since the magnetic recording layer used in the magnetic recording medium of the present invention contains platinum, it is particularly preferred that the third underlayer applied just below the magnetic recording layer is constituted from the metal material based on chromium and molybdenum. This is because the addition of molybdenum to chromium can widen the lattice spacing of the underlayer so that the widened lattice spacing can approach the lattice spacing of the overlying magnetic recording layer (CoCrPt-based alloy) which is widened depending upon the composition of the magnetic recording layer, particularly the Pt content, thereby accelerating a preferential longitudinal orientation for the C-axis of the magnetic recording layer.

Of course, if desired, the third underlayer may be formed from a metal material based on chromium and metal(s) other than molybdenum. The metal material or alloy suitable for the formation of the third underlayer includes CrW, CrV, CrTi and others.

The third underlayer is preferably formed in accordance with a sputtering method such as magnetron sputtering method under conventional sputtering conditions. Especially, to obtain a highly increased coercive force, it is preferred to carry out the sputtering process under the application of a negative DC bias. Suitable sputtering conditions include, for example, a temperature of about 100 to 300° C., argon (Ar) gas pressure of about 1 to 10 mTorr and negative DC bias of about 100 to 300V. If desired, in place of the sputtering method, other layer-forming methods such as vapor deposition and ion beam sputtering may be used. The layer thickness of the third underlayer may be widely varied depending upon various factors, however, to obtain an increased S/N ratio, it is preferred that the layer thickness of the third underlayer is in the range of about 5 to 60 nm. A layer thickness of less than 5 nm tends not to ensure satisfactory magnetic properties, and a layer thickness of more than 60 nm tends to increase the noise.

In the magnetic recording medium according to the present invention, the magnetic recording layer, as is described hereinabove, has a circumferential direction of easy magnetization, and is constituted from a four-component or five-component metal alloy which contains cobalt as a principal component thereof, and also contains chromium and platinum in combination with tantalum and/or tantalum.

In the magnetic recording layer of the magnetic recording medium, an amount of chromium and platinum used in combination with cobalt as the principal component is preferably as follows:

chromium about 14 to 22 at %, and platinum about 4 to 10 at %.

More particularly, when the magnetic recording layer is constituted from a four-component metal alloy of cobalt, chromium, platinum and tantalum, the layer should be preferably constituted so that it satisfies the following range of composition:

$$Co_{bal.}\text{—}Cr_{14-22}\text{—}Pt_{4-10}\text{—}Ta_x$$

in which
bal. means a balance, and
x is in the range of 1 to 5 at %.

Alternatively, when the magnetic recording layer is constituted from a five-component metal alloy of cobalt, chromium, platinum, tantalum and niobium, the layer should be preferably constituted so that it satisfies the following range of composition:

$$Co_{bal.}\text{—}Cr_{14-22}\text{—}Pt_{4-10}\text{—}Ta_x\text{—}Nb_y$$

in which
bal. means a balance, and
a sum of x and y (x+y) is in the range of 1 to 5 at %. The amount of the added tantalum and that of the added niobium in the five-component metal alloy are preferably the same or substantially the same.

In the magnetic recording medium of the present invention, the magnetic recording layer, regardless of its composition, i.e., four-component alloy or five-component alloy, preferably has a tBr value (product of a layer thickness t of the magnetic recording layer and its residual magnetic flux density Br) of 40 to 180 G.μm. The magnetic recording layer is particularly suitable for use in the magnetic recording medium designed to be used in combination with a MR head and other magnetoresistive heads, since it is characterized by being thinner in comparison with the prior art magnetic recording layers.

The magnetic recording layer formed through the specific underlayer on the nonmagnetic glass or silicon substrate is formed from a CoCrPtTa alloy or, alternatively, is formed from a CoCrPtTaNb alloy. The magnetic recording layer is preferably formed in accordance with a sputtering method under certain production conditions. Especially, to obtain a highly increased coercive force, it is preferred to carry out the sputtering process under the application of a negative DC bias. As in the above-described formation of the underlayers, the sputtering process may be advantageously carried out by using a magnetron sputtering method or other methods. Suitable sputtering conditions include, for example, a temperature of about 100 to 350° C., preferably about 200 to 320° C. and more preferably around about 250° C., argon (Ar) gas pressure of about 1 to 10 mTorr and negative DC bias of about 80 to 400V. Note herein that a temperature above about 350° C. should be avoided, because such a high temperature may give a magnetic characteristic to the substrate, which has to be nonmagnetic, during the sputtering process. In addition, if desired, in place of the sputtering method, other layer-forming methods such as vapor deposition and ion beam sputtering may be used. One suitable example for the production of the magnetic recording layer includes the step of depositing the magnetic recording layer from corresponding target alloy at a temperature of about 150 to 350° C. with the application of a negative DC bias in accordance with the sputtering method.

In particular, in the magnetic recording medium of the present invention, it is preferred that all the underlayers and the magnetic recording layer, described above, are formed as a thin layer by sputtering. That is, according to the present invention, a resistance to shock of the substrate such as glass substrate can be maintained without deterioration, if all the layers are formed by sputtering, and a thickness of each layer is controlled to below the predetermined thickness by controlling the sputtering conditions. Suitable sputtering conditions were described above.

Preferably, the magnetic recording medium of the present invention may further comprise, as the outermost layer and usually on the above-described magnetic recording layer, a protective layer frequently adopted in the art. Suitable protective layers include, for example, a layer consisting of carbon alone and layers of carbon compounds, for example, C layer, WC layer, SiC layer, $B_4C$ layer, and hydrogen-containing carbon (C) layer. In particular, a protective layer of carbon or diamondlike carbon (DLC) can be advantageously used in the practice of the present invention. The DLC layer can exhibit a highly increased hardness. The above protective layer may be deposited by the conventional method, for example, by sputtering or chemical vapor deposition. The layer thickness of the protective layer may vary widely depending upon various factors. It, however, is preferably about 5 to 15 nm.

In the magnetic recording medium of the present invention, in addition to the above-mentioned indispensable layers and optional layers, additional layers commonly used in the art may be included. Otherwise, the layers constituting the magnetic recording medium may be optionally subjected to chemical treatment or the like. For example, the protective layer may have thereon a lubricant layer comprising a fluorocarbon resin or otherwise may be subjected to treatment for imparting the same effect attained by the lubricant layer.

Further, according to the present invention, there is provided a modification of the above-described magnetic recording medium, i.e., a magnetic recording medium comprising a nonmagnetic substrate having applied, through an underlayer thereon, a magnetic recording layer consisting of a magnetic metal material, in which the underlayer may or may not contain the first underlayer based on chromium, the second underlayer consisting of a nickel alloy is formed by sputtering over the substrate in the presence or absence of the first underlayer, followed by being textured, and, preferably, the third underlayer based on chromium is further deposited over the second underlayer.

In this modification of the magnetic recording medium, a wide variety of substrates may be used as the nonmagnetic substrate. Suitable substrates include, for example, a glass substrate, a carbon substrate, a canasite substrate, an ABC substrate, a silicon substrate and a hard metal substrate. A roughness of the substrate surface is preferably about 15 Å or less to satisfy the requirement for the flying height of the recording head, i.e., a low flying height of 25 nm or less.

The first underlayer based on chromium, if it is included in the magnetic recording layer, is preferably formed from chromium alone or an alloy of chromium and other elements, as described above. The element(s) to be added to the chromium alloy include, for example, Ti, Zr, Hf, V, Nb, Ta, Mo and W. The layer thickness of the first underlayer is preferably in the range of 0 to 50 nm. The underlayer may be advantageously formed by sputtering, as described above.

The second underlayer consisting of an nickel alloy is preferably formed from nickel and aluminum (Al), titanium (Ti) or phosphorus (P), and, in the formation of such underlayer, the sputtering process and the texturing process can be advantageously carried out in accordance with the methods described above with reference to the formation of the underlayers. The layer thickness of the second underlayer is preferably in the range of 50 to 500 nm. Since the layer thickness is reduced to 500 nm or less, it becomes possible to maintain a good resistance to shock of the hard substrate. In contrast to the conventionally used aluminum substrate, it has been found that a high resistance to shock, of 300G or more in terms of acceleration, could be obtained according to the present invention.

The third underlayer based on chromium can be formed in accordance with a method similar to that used in the formation of the first underlayer, as in the above-described production of the magnetic recording medium.

Further, over the third underlayer, a protective layer such as diamondlike carbon (DLC) and a lubricant layer such as fluorocarbon resin can be advantageously applied, as in the above-described production of the magnetic recording medium.

According to the present invention, since the magnetic recording medium is constituted so as to have the above-described specific structure, it becomes possible to apply the conventional production process which was cultivated with regard to the production of the medium with the NiP-plated aluminum (Al) substrate to any other hard substrate, having a poor processability, thereby producing an improved magnetic recording medium showing a diminished friction between the magnetic recording medium and the recording head and a reduced flying height of the recording head. Further, according to the present invention, it becomes possible to improve the shock resistance of the prior art medium having the NiP-plated Al substrate, for which a poor shock resistance could not be overcome. In particular, if the above-described magnetic recording medium of the present invention is used in combination with the SFS-type magnetic recording head slider, a flying height of the recording head can be further reduced, along with a stable flying and friction properties of the head.

According to a further aspect of the present invention, there is provided a magnetic recording disk device, using the magnetic recording medium of the present invention described above and described below in detail. The structure of the magnetic disk device of the present invention is not particularly limited. Basically, however, the device comprises: a recording head section for recording information in a magnetic recording medium; and a reproducing head section for reproducing information. In particular, as will be described below, the reproducing head section is preferably provided with a magnetoresistive (MR) head using a magnetoresistor wherein the electric resistance changes in response to the magnetic field intensity.

In the magnetic recording disk device of the present invention, a composite magnetic head having the laminated structure in which a magnetoresistive reproducing head, for reading information from the magnetic recording medium, which comprises a magnetoresistor and a conductive layer for supplying a sense current into the magnetoresistor, and an induction type recording head, for recording information on the magnetic recording medium, which has a pair of thin film electrodes, are laminated, can be preferably used. Magnetoresistive reproducing heads usable herein may have various structures known in the art and suitable examples thereof include AMR-(anisotropic magnetoresistive) heads utilizing anisotropic magnetoresistance and GMR (giant magnetoresistive) heads utilizing giant magnetoresistance (including spin valve GMR head and the like). The conductor layer of the reproducing head may have various constructions. However, preferred conductor layers include:

1. a conductor layer having such a thickness that the thickness of the conductor layer in its portion in the vicinity of the magnetoresistor is relatively small with the thickness in the other portion being large; and
2. a conductor layer wherein the thickness and the width of the conductor layer, in the portion in the vicinity of the magnetoresistor, are relatively small with the thickness and the width in the other portions being large. The thickness and, if necessary, the width of the conductor layer may be controlled by various methods to satisfy the above requirements. A particularly recommendable method for such control is to increase the thickness by forming the conductor layer so as to have a multi-layer structure.

As compared with the conventional composite magnetic head, the magnetic disk device particularly having the above construction can reduce the curving of the magnetic pole of the recording head section and, at the same time, can reduce the resistance of the conductor layer and, when the off-track error is small, can read information with high accuracy and sensitivity.

Further, in the magnetic pad-like recording disk device of the present invention, it is preferred to dispose the above-described magnetoresistive head on a stiction-free slider (SFS) which has rails for creating a flying force on a face, opposed to the magnetic recording medium, of the slider, and also has two or more projections or protrusions for preventing stiction on a flying face of the rails. More preferably, the disk medium used in combination with the head provided with the stiction-free slider has a surface roughness Ra in the range of 6 to 40 Å.

The SFS slider has two or more pad-like protrusions on a flying face thereof to prevent its stiction or adhesion on a surface of the disk medium. Any suitable slider structures may be adopted in the practice of the present invention, and one example of suitable slider structures can be found in Japanese Unexamined Patent Publication (Kokai) No. 61-48182. The floating-type magnetic head disclosed in this publication has at least three slider pads in the form of a semispherical protrusion on a face, opposed to a surface of the magnetic recording medium, of the head-supporting substrate, and at least one slider pad has an electromagnetic convertor. Using this floating-type magnetic head, it becomes possible to diminish a variation of the flying height of the head with regard to the direction of yaw angle because of presence of protrusions on the slider surface, thereby enabling to stably float the flying head without changing a flying position of the head, even if the yaw angle is increased to several tens of degrees. The flying-type magnetic head disclosed in Japanese Unexamined Patent Publication (Kokai) No. 61-151827 is also useful in the practice of the present invention. The flying-type magnetic head disclosed in this publication is characterized by disposing protrusions on an end portion (air inflow side) of the flying face of the slider, opposed to the magnetic recording medium, a height of the protrusions being larger than the surface roughness of the magnetic recording medium and being smaller than the flying height of the head. Using this flying-type magnetic head, it becomes possible to reduce a contact friction of the head against the magnetic recording medium as a function of the protrusions on the flying face of the slider, thereby enabling excellent flying and running of the head along with a large stability and a small flying height.

For the conventional magnetic heads, it was impossible to avoid an adhesion or stiction of the magnetic head to the magnetic recording medium, when a surface of the disk used has a roughness Ra of not more than 40 Å. Contrary to this, the magnetic head provided with the SFS slider can remove such stiction problem. In fact, it has been found that even if the surface-roughness Ra of the medium is reduced to 6 Å, no stiction is caused between the SFS slider-mounted head and the medium. Generally, the conventional lubricant layer applied on a surface of the magnetic recording medium can adversely affect on the prevention of the stiction, however, surprisingly, the inventors have found that, according to the present invention, stiction between the head and the medium can be effectively prevented even if the lubricant layer is applied at a substantial thickness of about 20 Å over the magnetic recording layer of the medium.

In addition to the above findings, the inventors have found that a flying characteristic of the head can be effectively controlled with the reduction of the surface roughness of the magnetic recording medium, because the flying characteristic can largely depend on the surface roughness of the medium. For the magnetic recording medium of the present invention, typical examples thereof, as described above, include those comprising a thin and sputtered NiP layer on a glass substrate, and the glass substrate with the sputtered NiP layer is particularly suitable for the texturing process to obtain a small surface roughness Ra. This is because the glass substrate has a higher hardness than the NiP layer, and therefore, due to difference in the hardness between the glass substrate and the NiP layer, texturing can be selectively applied to only a surface of the NiP layer. As an alternative method, if the substrate used is not harder than the glass substrate, a hard layer may be sandwiched between the substrate and the NiP layer.

Figure 14:
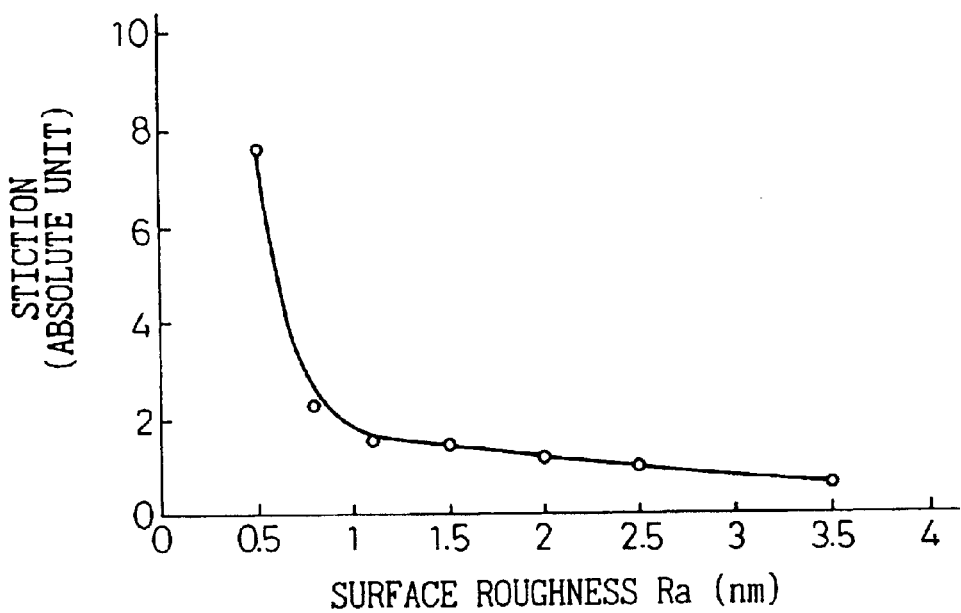
FIG. 14 is a graph showing a dependency of the stiction upon a surface roughness Ra of the disk in the magnetic recording device using a stiction-free slider.
Figure 15:
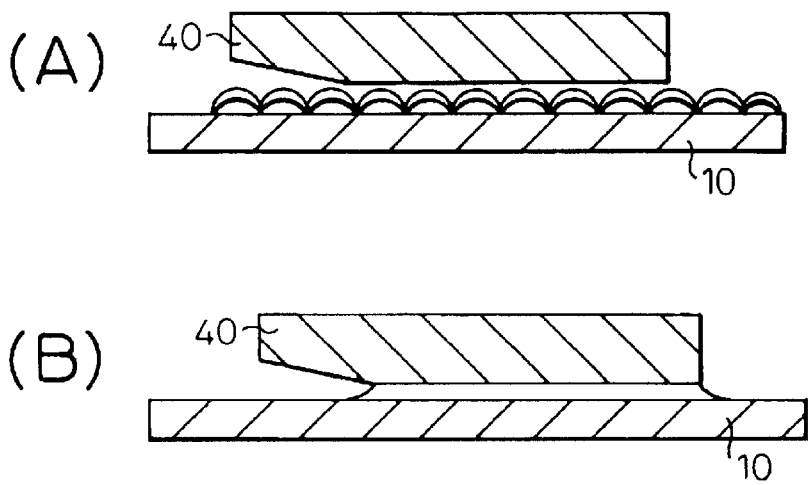
FIG. 15 is a cross-sectional view illustrating an adsorption of the head on the disk in the conventional slider.
Figure 16:
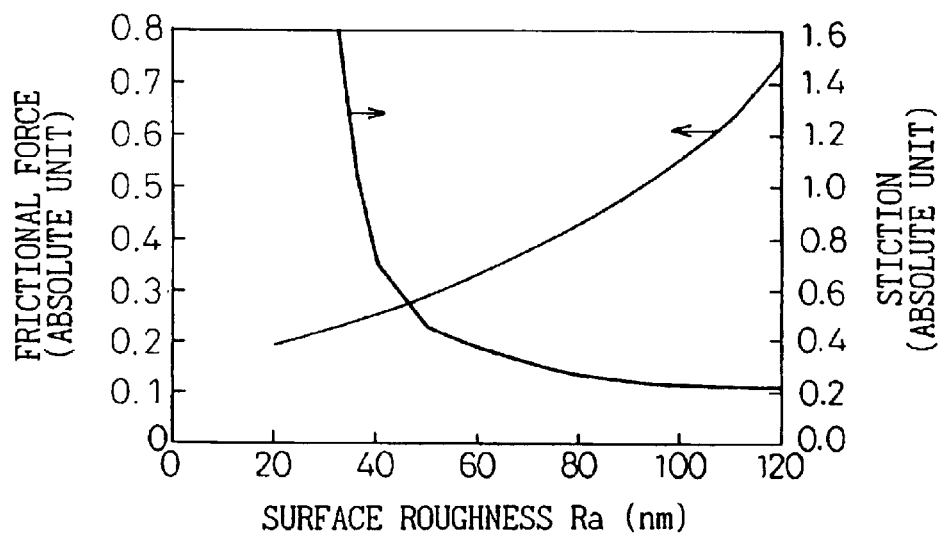
FIG. 16 is a graph showing a dependency of the frictional force and stiction upon the surface roughness Ra in the conventional slider.

The SFS slider including its functions will be described hereinafter with reference to FIGS. 14 to 16 in which FIG. 14 is a graph showing a dependency of the stiction (absolute unit) upon a surface roughness Ra of the magnetic recording medium or disk in the magnetic recording device using a STF slider, FIG. 15 is a cross-sectional view illustrating an adsorption or stiction of the head on the disk in the conventional slider, and FIG. 16 is a graph showing a dependency of the frictional force (absolute unit) and stiction (absolute unit) upon the surface roughness Ra in the conventional slider.

As described above, the SFS slider is characterized by having protrusions on a flying face of the slider, and is intended to inhibit an adhesion or stiction of the slider on the disk. A height of the protrusions is generally in the range of 1 to 10 nm, and is smaller than a flying height of the head. Further, since the SFS slider generally floats during operation of the head in such a manner that a front end of the slider is positioned at a higher level than a back end of the same, undesirable contact of the floated head to the disk can be prevented, if the protrusions are provided in front of the constituent members of the head itself. The results and effects will be understood from the graph of FIG. 14, that is, no stiction is caused even if the surface roughness Ra of the disk is reduced to 1 nm or less.

Contrary to this, the conventional sliders having no protrusion suffer from the adhesion or stiction problem illustrated in FIG. 15. That is, when the slider (for convenience, the reference numeral 40 is given) is used in combination with the disk 10, since a surface of the disk 10 contains a liquid such as lubricant as is illustrated in FIG. 15(A), an adhesion of the slider 40 onto a surface of the disk 10 can be generated as a function of the surface tension of the liquid, during operation of the magnetic disk device, as is illustrated in FIG. 15(B). A tendency of the adhesion problem to be generated is increased, along with increase of the adhesion force, with reduction of a surface roughness of each of the slider 10 and the disk 40. As a result, as is plotted in FIG. 16, the stiction can be generated at a surface roughness Ra of not more than 4 nm, and friction force can be increased with the increase of the surface roughness Ra. In this connection, the inventors have also found that when the SFS slider is used in the practice of the present invention, satisfactory results can be obtained if the SFS slider is used in combination with the disk having a small surface roughness Ra such as 1 nm.

Figure 2:
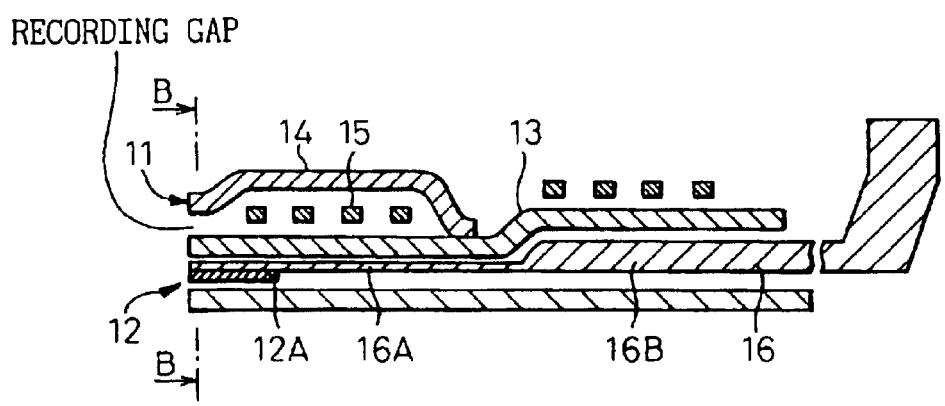
FIG. 2 is a cross-sectional view showing the principle of the magnetoresistive head in the magnetic recording disk device of the present invention.
Figure 3:
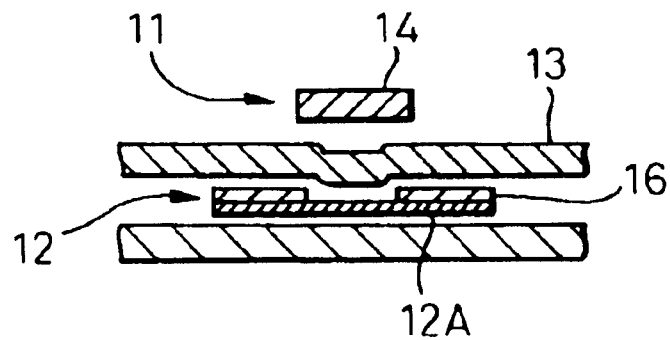
FIG. 3 is a cross-sectional view taken along line B—B of the magnetoresistive head shown in FIG. 2.

In the magnetic recording disk device of the present invention, preferably, the recording head section and the reproducing head section each may have a laminated structure as shown in FIGS. 2 and 3. FIG. 2 shows a diagram showing the principle of the magnetic disk device of the present invention, and FIG. 3 is a cross-sectional view taken along line B—B of FIG. 2.

In FIGS. 2 and 3, reference numeral 11 designates an induction type recording head section for recording information on a magnetic recording medium, and reference numeral 12 designates a magnetoresistive reproducing head section for reading information. The recording head section 11 comprises: a lower magnetic pole (an upper shield layer) 13 of NiFe or the like; an upper magnetic pole 14 of NiFe or the like, which faces the lower magnetic pole 13 while leaving a certain-space; and a coil 15 for exciting the magnetic poles 13 and 14 and permitting information recording on the magnetic recording medium to be conducted in a recording gap section.

The reproducing head section 12 is preferably constituted by an AMR head, a GMR head or the like. On a magnetoresistor section 12A are provided a pair of conductor layers 16, for supplying a sense current into the magnetoresistor 12A, while leaving a space, corresponding to the width of a recording track, between the two conductor layers 16. In this instance, the thickness of the conductor layers 16 is such that thickness of a portion 16A in the vicinity of the magnetoresistor section 12A is relatively small and the thickness of the other portion 16B is relatively large.

In the head structure shown in FIGS. 2 and 3, since the thickness of the conductor layer 16 is small in the portion 16A in the vicinity of the magnetoresistor section 12A, the curving of the lower magnetic pole (upper shield layer) 13 and the like is correspondingly small. By virtue of this, the recording gap facing the magnetic recording medium is also not significantly deformed. Therefore, even though the position, on a track, of the magnetic head at the time of information recording is somewhat shifted from the position, on the track, of the magnetic recording at the time of reading of the information, the magnetic disk device can accurately read information, making it possible to eliminate reading errors at a small off-track amount.

On the other hand, since the thickness of the conductor layer 16 is large in the portion 16B other than that in the vicinity of the magnetoresistor section 12A, the whole resistance of the conductor layer 16 can be reduced. As a result, a change in resistance of the magnetoresistor section 12A can be detected with a high sensitivity, resulting in improved S/N ratio. Further, generation of heat in the conductor layer 16 can also be avoided, thus preventing the generation of noise due to the generation of heat.

Figure 4:
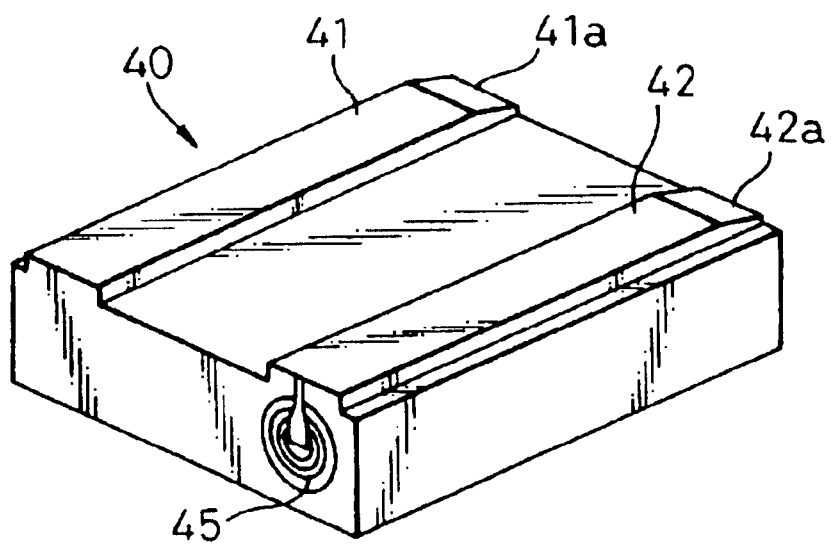
FIG. 4 is a perspective view illustrating one preferred embodiment of the slider with a magnetic head used in the magnetic disk device of the present invention.

The above-described magnetic head of the magnetoresistive type can be produced by simultaneously forming a plurality of the magnetic heads on a head substrate of the ceramic material in accordance with the conventional thin layer formation methods, followed by cutting the head substrate to obtain discrete magnetic heads and then fabricating each head to obtain a desired shape. FIG. 4 is a perspective view of a slider provided with a magnetic head, produced in accordance with the above process. In the slider shown in FIG. 4, rails 41 and 42 for creating a flying force are provided along the direction of an air stream created by the rotation of the magnetic recording medium (not shown) on the face, opposite to the magnetic recording medium, of the slider 40. Inclined faces 41a and 42a are formed on the air inflow side of the flying face of the rails 41 and 42, and the magnetic head 45 described above is provided on the rear end face of the rail 42 in the slider 40.

In the practice of the present invention, as is described above, it is preferred to use a stiction-free slider, i.e., STF slider, in which the slider with a magnetic head is also provided with two or more protrusions on the flying face of the rails.

Figure 5:
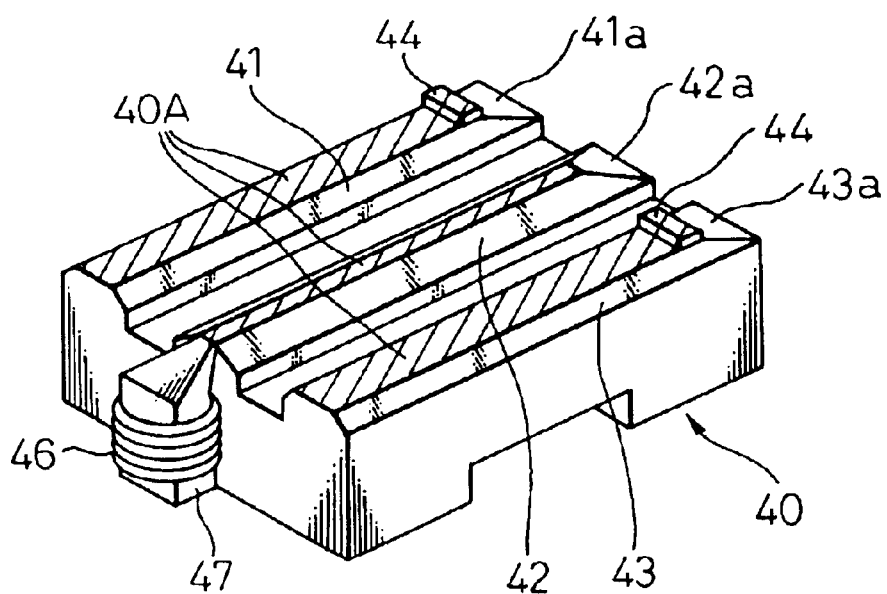
FIG. 5 is a perspective view illustrating another preferred embodiment of the slider with a magnetic head used in the magnetic disk device of the present invention.
Figure 6:
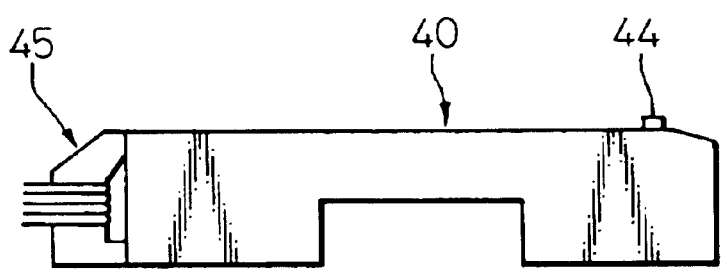
FIG. 6 is a front view of the slider illustrated in FIG. 5.

FIGS. 5 and 6 are a perspective view and a front view of the SFS slider, i.e., flying type slider provided with a magnetic ferrite head, which can be advantageously used in the practice of the present invention, respectively. The illustrated slider with the magnetic head has an integrally bonded structure consisting of a body of head 45 for use in information recording and reproduction in the magnetic recording medium, i.e., magnetic disk (not shown), and a slider 40 for stably flying the head 45. The head 45 also has a coil 46 and a yoke 47. The slider 40 has a function as a yoke of the magnetic head, in addition to the function as the slider itself, and has three parallel rails 41, 42 and 43, disposed along the direction of the created air stream, on a flying face (diagonally hatched area) 40A to be opposed to the magnetic disk. Each rail has an inclined face 41a, 42a or 43a on the air inflow side thereof. Among the three rails on the flying face 40A of the slider 40, the rails 41 and 43 each, as illustrated, has a small protrusion 44 disposed in an end portion of the air inflow side, i.e., opposite side of the head 45. The protrusions 44 can be applied to the end portion of the rails 41 and 43 by using any suitable methods, and, for example, the protrusions can be advantageously produced by forming a rail with the predetermined shape, followed by selectively etching a surface area of the rail in the presence of a masking means covering the protrusion area.

In the formation of the protrusions, it is necessary to satisfy the requirements that the height of the protrusions is larger than a surface roughness of the magnetic disk, but is smaller than a flying height of the head. For example, assuming that the magnetic disk used has a maximum surface roughness R max of 0.02 $\mu$m and a flying height of the slider, determined during normal rotation of the magnetic disk, is 0.6 $\mu$m at its end portion of the air inflow side, it is preferred that the height of the protrusions be in the range of 0.04 to 0.1 $\mu$m. Excessively increased protrusion height should be avoided, because it causes erroneous contact of the disk surface with the protrusions and deterioration of flying stability of the head as a result of loss of a balanced flying position of the head.

In the illustrated embodiment and other preferred embodiments of the present invention, since two or more protrusions are disposed on the predetermined sites of the flying face of the slider, it becomes possible to avoid contact of a surface of the magnetic disk with a whole of the flying face of the slider. That is, only the protrusions are concerned in the contact process. Because of remarkably reduced contact area between the disk and slider, a sliding friction of the magnetic head to a surface of the magnetic disk can be noticably reduced during flying process of the head, thereby enabling good running or operation of the head.

Figure 7:
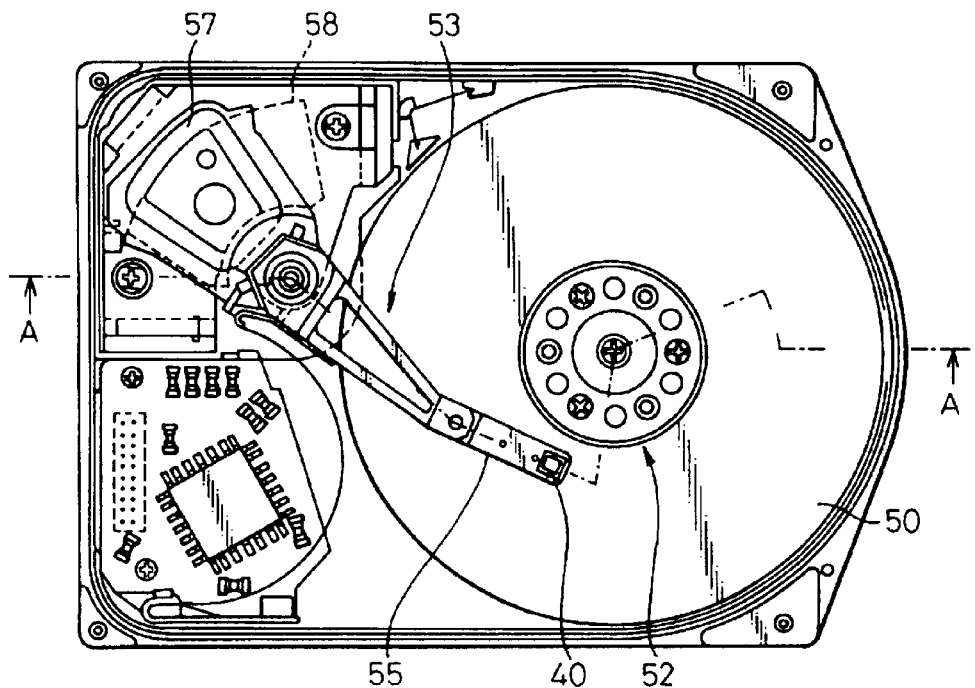
FIG. 7 is a plan view of the magnetic recording disk device according to one preferred embodiment of the present invention.
Figure 8:
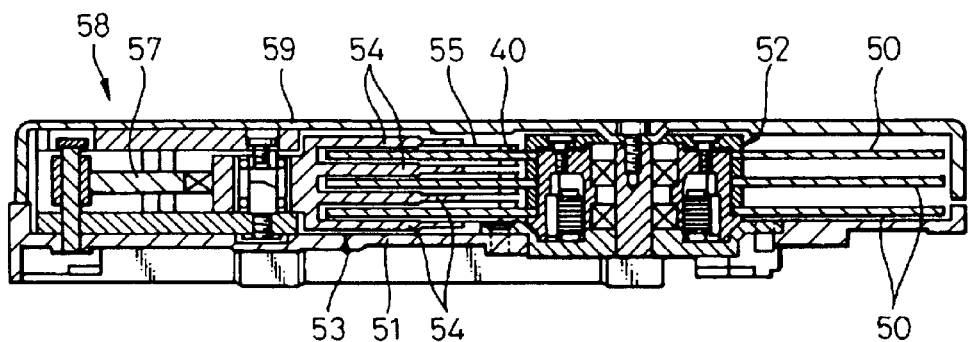
FIG. 8 is a cross-sectional view taken along line A—A of the magnetic recording disk device shown in FIG. 7.

Further, FIGS. 7 and 8 illustrate one preferred embodiment of the magnetic disk device according to the present invention. FIG. 7 is a plan view of the magnetic disk device from which a cover was removed for the sake of understanding the structure, and FIG. 8 is a cross-sectional view taken along line A—A of FIG. 7.

In these drawings, numeral 50 designates a plurality of magnetic disks (three disks are contained for the present embodiment) as a magnetic recording medium which is rotated and driven by means of a spindle motor 52 provided on a base plate 51.

Numeral 53 designates an actuator rotatably provided on the base plate 51. A plurality of head arms 54, which extend toward the recording face of the magnetic disk 50 are provided on one rotation end of the actuator 53. A spring arm 55 is rotatably mounted on the rotation end of the head arm 54, and, further, the above-described slider 40 is inclinably mounted through an insulating layer (not shown) on the flexure section of the spring arm 55. On the other hand, a coil 57 is provided on the other rotation end of the actuator 53.

A magnetic circuit 58 constituted by a magnet and a yoke is provided on the base plate 51, and the coil 57 is disposed within the magnetic gap of the magnetic circuit 58. The magnetic circuit 58 and the coil 57 constitute a moving coil type linear motor (VCM: voice coil motor). The upper surface of the base plate 51 is covered with a cover 59.

The operation of the magnetic disk device having the above constitution will be described. When the magnetic disk 50 is in a stopped state, the slider 40 is in contact with a siding zone and in a stopped state.

When the magnetic disk 50 is rotated and driven at a high speed by means of a spindle motor 52, an air stream created by the rotation of the magnetic disk 50 permits the slider 40 to fly above the disk face while leaving a very small space between the slider and the disk surface. In this state, application of a current to the coil 57 creates thrust in the coil 57, thus rotating the actuator 53. This permits the head (slider 40) to be moved to a desired track of the magnetic disk 50 to conduct reading/wiring of data.

In this magnetic disk device, the conductor layer in the magnetic head has a small thickness in the vicinity of the magnetoresistor section with the thickness of the other portion being large. This specific constitution reduces the curving of the magnetic pole of the recording head section and, at the same time, lowers the resistance of the conductor layer and, in the case of small off-track, enables information to be read with high accuracy and high sensitivity.

As can be understood from the foregoing detailed description of the present invention and the appended working examples, according to the present invention, an improvement in S/N ratio of the magnetic recording medium over that of the conventional magnetic recording medium can be accomplished, thereby realizing a magnetic disk device having a higher density than the conventional device.

EXAMPLES

The present invention will be described in more detail with reference to typical examples thereof. However, it should be noted that the present invention is not limited to these examples. Note that FCI frequently used herein is an abbreviation of "Flux Changes per Inch".

Example 1

Production of the magnetic recording medium (magnetic disk)

Chromium (Cr, as a first underlayer) and nickel-phosphorus (NiP, as a second underlayer) were sputtered in the above order onto a surface of the well-cleaned disk-like glass substrate, using a DC magnetron sputtering system. First, to form a first underlayer, a sputtering chamber of the system was evacuated to obtain a reduced pressure of not more than $3 \times 10^{-7}$ Torr, a temperature of the substrate was increased to 200° C., and an argon (Ar) gas was introduced into the sputtering chamber to maintain the chamber at the pressure of 5 mTorr. While applying a bias voltage of −200V, Cr was sputtered to form a Cr underlayer having a thickness of 25 nm.

Next, under the same sputtering conditions, NiP was sputtered from a $Ni_{2P}$ target to form a NiP underlayer having a thickness of 100 nm on the Cr underlayer, followed by subjecting a surface of the resulting NiP underlayer to a texturing process using diamond abrasive grains having a grain size of 1 μm. In the texturing process, a surface of the NiP underlayer was rubbed with abrasive grains to form circumferentially distributed fine stripes thereon. After completion of the texturing process, circumferentially extended stripe-like ridges and grooves were formed on a surface of the NiP underlayer. A surface roughness of the textured NiP underlayer was determined to be 15 Å in a radial direction and 7A in a circumferential direction.

Subsequent to the formation of the textured NiP underlayer, using the same DC magnetron sputtering system, a CrMo10 (at %) underlayer as a third underlayer, a CoCrPtTaNb-based magnetic recording layer and a carbon (C) protective layer were sputtered in the above order on the textured NiP underlayer.

As in the above sputtering process, before formation of the third underlayer, a sputtering chamber of the system was evacuated to obtain a reduced pressure of not more than $3 \times 10^{-7}$ Torr, a temperature of the substrate was increased to 200° C., and an argon (Ar) gas was introduced into the sputtering chamber to maintain the chamber at the pressure of 5 mTorr. Then, while applying a bias voltage of −200V, CrMo was sputtered to form a CrMo underlayer having different thicknesses of from 10 nm to 60 nm. Then, over the resulting three layered underlayer, Co, Cr, Pt, Ta and Nb were sputtered from a composite target comprising a CoCr target with Pt, Ta and Nb chips to form a CoCrPtTaNb-based magnetic layer having a tBr of 100 G.μm (corres. to 27 nm thickness). The alloy of the magnetic layer was determined to have the composition: $Co_{72}Cr_{19}Pt_5Ta_2Nb_2$. Similarly, a carbon protective layer was sputtered on the CoCrPtTaNb-based magnetic layer. The-magnetic disk according to the present invention (hereinafter, referred to as "Magnetic disk 1") having a layer structure which was described with reference to FIG. 1 was thus produced.

For the comparison purpose, the above procedure was repeated to produce two different comparative magnetic disks A and B having the following distinguishable features:

Magnetic disk A
  NiP underlayer was omitted (no NiP).
Magnetic disk B
  Texturing process was omitted from a surface of the NiP underlayer (no texture).

Example 2

Evaluation of the magnetic disks

The magnetic disk 1 as well as the comparative magnetic disks A and B, produced in Example 1, were tested to evaluate the below-itemized characteristics (1) to (7). Note that, in the evaluation tests, the analysis of the composition was made by using a-EDX system, and magnetic values were determined by using a VSM system.

(1) Dependency of Siso/Nm of the isolated wave in the medium upon the NiP underlayer:

A Siso/Nm value of the isolated wave in the medium was determined for each magnetic disk. The results are summarized in the following Table 1, along with the coercive force Hc (Oe), Br/B5,000 and residual magnetic flux density Br (G) which are incorporated for the reference. Note that a thickness of the CoCrPtTaNb-based magnetic layer was 25 μm for each disk, and the Siso/Nm value was calculated from the following equation:

Siso/Nm=20 log (Siso rms/Nm rms).

That is, the Siso/Nm value was determined based on an output of the isolated wave at a lead width of 1 μm and a rms value of the medium noise at the recording density of 160 KFCI.

TABLE 1

| magnetic disk | Hc (Oe) | Br/B5,000 | Br (G) | Siso/Nm |
| --- | --- | --- | --- | --- |
| 1 (present invention) | 2,300 | 0.75 | 3,200 | 29.4 |
| A (no NiP) | 2,300 | 0.65 | 2,700 | 20.2 |
| B (no texture) | 2,300 | 0.65 | 2,700 | 28.5 |

The above results indicate that the layer structure adopted in the magnetic disk of the present invention is effective to increase the S/N ratio of the medium, and a greater increase of the S/N ratio can be obtained in the presence of the NiP underlayer than in the absence of such underlayer, and also in the textured NiP underlayer than in the nontextured NiP underlayer.

(2) Dependency of increase of the S/N ratio upon the Cr concentration of the magnetic layer:

In the above evaluation test (1), all the magnetic disks tested had a magnetic layer of the composition: $Co_{72}Cr_{19}Pt_5Ta_2Nb_2$. In this test, to ascertain any possible influence of the Cr concentration of the magnetic layer on an increase of the S/N ratio, the procedure of Example 1 was repeated to produce the magnetic disks having different Cr concentrations in the CoCrPtTaNb-based magnetic layer, followed by the above evaluation test (1). As a result, it has been found that a S/N ratio can be remarkably increased at a higher Cr concentration, and the Cr concentration in the magnetic layer should be at least 14 at % to attain a satisfactory increase of the S/N ratio. This is considered to be because a higher Cr concentration enables to easily orient a C-axis of the Co (hcp) layer toward a perpendicular direction, and also the NiP underlayer can effectively act to further orient the C-axis toward an areal direction.

(3) Dependency of the coercive force Hc in a horizontal direction and a perpendicular direction of the medium upon the NiP underlayer:

To ascertain how the presence or absence of the NiP underlayer can affect on the coercive force Hc in a horizontal direction, i.e., Hc//, and that in a perpendicular direction, i.e., Hc⊥, the coercive forces Hc// and Hc⊥ were determined for the magnetic disk 1 and the comparative magnetic disk A. The results are summarized in the following Table 2.

TABLE 2

| magnetic disk | horizontal Hc// (Oe) | perpendicular Hc⊥ (Oe) | ratio of Hc (Hc⊥/Hc//) |
|---|---|---|---|
| 1 (present invention) | 2,300 | 500 | 0.22 |
| A (no NiP) | 2,300 | 700 | 0.30 |

The above results indicate that a perpendicular coercive force Hc ⊥ can be remarkably increased in the absence of the NiP underlayer, and thus a perpendicular anisotropy can be increased as a result of the remarkable increase of the Hc ratio, i.e., perpendicular coercive force Hc ⊥ to horizontal coercive force Hc//. As is well-known in the art, a higher level of the perpendicular anisotropy is not desired for the longitudinal magnetic recording, because it can act as a barrier to an increase in recording density.

Figure 9:
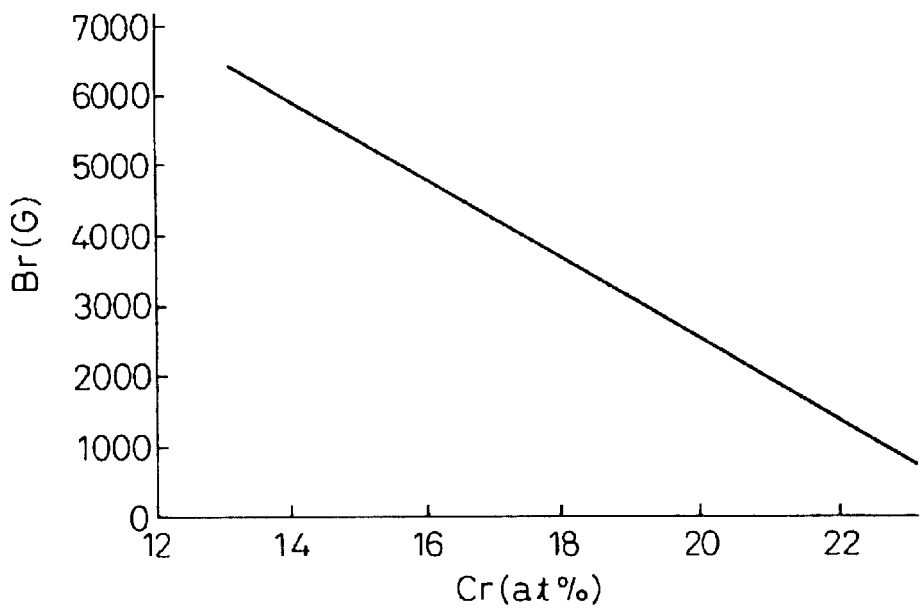
FIG. 9 is a graph showing a dependency of the residual magnetic flux density Br of the magnetic recording medium upon the Cr content of the magnetic layer.

(4) Dependency of the residual magnetic flux density Br upon the Cr concentration of the magnetic layer:

To ascertain any variation of the residual magnetic flux density Br with change of the Cr concentration of the magnetic layer, the procedure of Example 1 was repeated to produce the magnetic disk 1 with the proviso that the Cr concentration in the CoCrPtTaNb-based magnetic layer was varied as is shown in FIG. 9, followed by determination of the Br value. The results plotted in FIG. 9, i.e., graph showing a dependency of the residual magnetic flux density Br of the magnetic disk 1 upon the Cr content of the magnetic layer, were obtained. The graph of FIG. 9 indicates that the Br value can be linearly reduced with increase of the Cr content, and, to obtain a Br value of around 2,000G which is a standard for the desired magnetic disks, the Cr content is desirably 22 at % or less.

Figure 10:
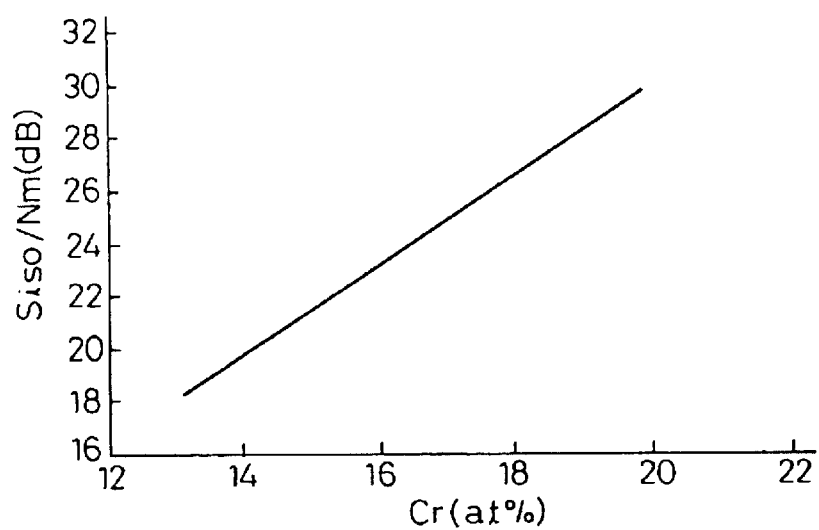
FIG. 10 is a graph showing a dependency of the Siso/Nm of the isolated wave in the magnetic recording medium upon the Cr content of the magnetic layer.

(5) Dependency of Siso/Nm of the isolated wave in the medium upon the Cr concentration in the magnetic layer:

The magnetic disks 1 having different Cr concentrations in the CoCrPtTaNb-based magnetic layer were produced, and a variation of the Siso/Nm value of the medium was determined at different Cr concentrations. The results plotted in FIG. 10, i.e., graph showing a dependency of the Siso/Nm value of the isolated wave in the magnetic disk 1 upon the Cr content of the magnetic layer, were obtained. The graph of FIG. 10 indicates that the Siso/Nm value is increased with increase of the Cr content, and the Cr content of at least 14 at % is required to satisfy the desired level, i.e., Siso/Nm of 20 dB, at the lead width of 1 μm.

Figure 11:
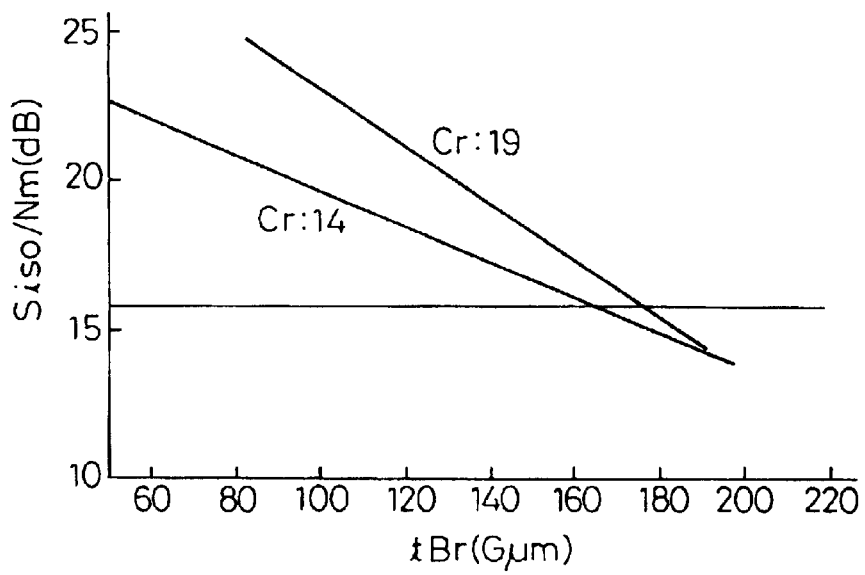
FIG. 11 is a graph showing a dependency of the Siso/Nm of the isolated wave in the magnetic recording medium upon the tBr value of the medium, with different Cr contents.

(6) Dependency of Siso/Nm of the isolated wave in the medium upon the tBr value:

The magnetic disks 1 having different tBr values in the CoCrPtTaNb-based magnetic layer were produced, and a variation of the Siso/Nm value of the medium was determined at different tBr values. The results plotted in FIG. 11, i.e., a graph showing the dependency of the Siso/Nm value of the isolated wave in the magnetic disk 1 upon its tBr value, with different Cr contents, were obtained. The graph of FIG. 11 indicates that a tBr value of not more than 180 G.μm is required to satisfy the desired level, i.e., Siso/Nm of 16 dB, and thus reduction of the tBr value is preferred to improve a Siso/Nm value of the medium. Also, in this connection, comparing the curve of the Cr content of 14 at % with that of 19 at %, a higher Cr content is preferred to improve a Siso/Nm value of the medium. Note that a lower limit of the tBr value may vary depending upon the type of the magnetic head used, however, it is preferred, in view of thermal stability and other factors, that the lower limit of the tBr is 40 G.μm.

(7) Other evaluation tests:

In addition to the above-described evaluation tests, the magnetic disks 1 having different Pt concentrations in the CoCrPtTaNb-based magnetic layer were produced, and a variation of the magnetic characteristics of the medium was determined at different Pt concentrations. As a result, it has been found that satisfactory magnetic characteristics comparable to those of the above tests could be obtained at the Pt concentration in the range of 4 to 10 at %.

Similar evaluation tests were further made with regard to the magnetic disks 1 having different Ta and Nb concentrations in the CoCrPtTaNb-based magnetic layer. As a result, it has been found that satisfactory magnetic characteristics comparable to those of the above tests could be obtained at a total of the Ta and Nb concentrations in the range of 1 to 5 at %, and the best S/N ratio could be obtained when Ta and Nb each is contained in the range of 1.5 to 2 at %.

Furthermore, it has been found that in the formation of the CoCrPtTaNb-based magnetic layer with sputtering, satisfactory magnetic characteristics comparable to those of the above tests could be obtained when the sputtering temperature is in the range of 200 to 250° C.

Example 3

The procedure of Example 1 was repeated to produce the magnetic disk 1 as well as the comparative magnetic disks A and B with the proviso that, in the formation of the magnetic layer, its composition was changed from $Co_{72}Cr_{19}Pt_5Ta_2Nb_2$ to $Co_{77}Cr_{15}Pt_4Ta_4$. A S/N ratio of each magnetic disk was determined and evaluated in accordance with the manner described in Example 2. As a result, it has been found that according to the present invention, satisfactory results comparable to those of Example 2 could be obtained, in contrast to the comparative magnetic disks A and B.

Example 4

Production of the magnetic recording medium (magnetic disk)

Chromium (Cr, as a first underlayer) and nickel-phosphorus (NiP, as a second underlayer) were sputtered in the above order onto a surface of the well-cleaned disk-like glass substrate, using a DC magnetron sputtering system. First, to form a first underlayer, a sputtering chamber of the system was evacuated to obtain a reduced pressure of not more than $3 \times 10^{-7}$ Torr, a temperature of the substrate was increased to 250° C., and an argon (Ar) gas was introduced into the sputtering chamber to maintain the chamber at the pressure of 5 mTorr. While applying a bias voltage of −200V, Cr was sputtered to form a Cr underlayer having a thickness of 25 nm.

Next, under the same sputtering conditions, NiP was sputtered from a $NI_2P$ target to form a NiP underlayer having a thickness of 100 nm on the Cr underlayer. In the formation of the Nip underlayer, a composition of the $NI_2P$ target was changed in order to obtain three different compositions, i.e., Ni67-P33 (at %), Ni75-P25 (at %) and Ni81-P19 (at %), in the NiP underlayer.

After formation of the NiP underlayer, its surface was textured using diamond abrasive grains having a grain size of 1 μm. In the texturing process, a surface of the NiP underlayer was rubbed by the abrasive grains to form circumferentially distributed fine stripes thereon. After completion of the texturing process, circumferentially extended stripe-like ridges and grooves were formed on a surface of the NiP underlayer. The surface roughness of the textured NiP underlayer was determined to be 15 Å in a radial direction and 7 Å in a circumferential direction.

Subsequent to the formation of the textured NiP underlayer, using the same DC magnetron sputtering system, a CrMo10 (at %) underlayer as a third underlayer, a CoCrPtTaNb-based magnetic recording layer and a carbon (C) protective layer were sputtered in the above order on the textured NiP underlayer.

As in the above sputtering process, before deformation of the third underlayer, a sputtering chamber of the system was evacuated to obtain a reduced pressure of not more than $3 \times 10^{-7}$ Torr, a temperature of the substrate was increased to 250° C., and an argon (Ar) gas was introduced into the sputtering chamber to maintain the chamber at the pressure of 5 mTorr. Then, while applying a bias voltage of −200V, CrMo was sputtered to form a CrMo underlayer having a thickness of 25 nm. Then, over the resulting three layered underlayer, Co, Cr, Pt, Ta and Nb were sputtered from a composite target comprising a CoCr target with Pt, Ta and Nb chips to form a CoCrPtTaNb-based magnetic layer having a tBr of about 80 G.μm (corres. to 25 nm thickness). The alloy of the magnetic layer was determined to have the composition: $Co_{72}Cr_{19}Pt_5Ta_2Nb_2$. Similarly, a carbon protective layer was sputtered on the CoCrPtTaNb-based magnetic layer. The magnetic disks according to the present invention [hereinafter, referred to as "Magnetic disk 2" (Ni67-P33), "Magnetic disk 3" (Ni75-P25) and "Magnetic disk 4" (Ni81-P19)], each having a layer structure which was described with reference to FIG. 1, were thus produced.

For the comparison purpose, the above procedure was repeated to produce a comparative magnetic disk C having no NiP underlayer.

Example 5

Evaluation of the magnetic disks

The magnetic disks 2 to 4 and the comparative magnetic disk C, produced in Example 4, were tested to evaluate the below-itemized characteristics (1) to (8). Note that, in the evaluation tests, the analysis of the composition was made by using a EDX system, and magnetic values were determined by using a VSM system.

(1) Dependency of S/Nm ratio of the medium upon the NiP underlayer:

A S/Nm ratio of the medium was determined for each magnetic disk. The results are summarized in the following Table 3, along with the areal coercive force Hc (Oe), perpendicular coercive force Hc (Oe), S* and tBr (G.μm) which are incorporated for the reference. Note that the S/Nm ratio was calculated from the following equation:

S/Nm=20 log (S rms/Nm rms).

That is, the S/Nm ratio was determined based on an output of the isolated wave at a lead width of 1 μm and a rms value of the medium noise at the recording density of 160 KFCI.

TABLE 3

| magnetic disk | areal Hc (Oe) | perpendicular Hc (Oe) | S* | tBr (G · μm) | S/Nm (dB) |
|---|---|---|---|---|---|
| 2(Ni67-P33) | 2,500 | 489 | 0.82 | 80 | 28.4 |
| 3(Ni75-P25) | 2,514 | 340 | 0.71 | 80 | 27.7 |
| 4(Ni81-P19) | 2,564 | 333 | 0.70 | 80 | 27.8 |
| C(no NiP) | 2,364 | 679 | 0.75 | 80 | 20.5 |

The above results indicate that if a NiP underlayer is inserted between the glass substrate and the Cr-based underlayer to form a layer structure of the magnetic disk according to the present invention, an areal orientation of the medium can be improved, thereby ensuring a large improvement in the S/Nm ratio.

Figure 12:
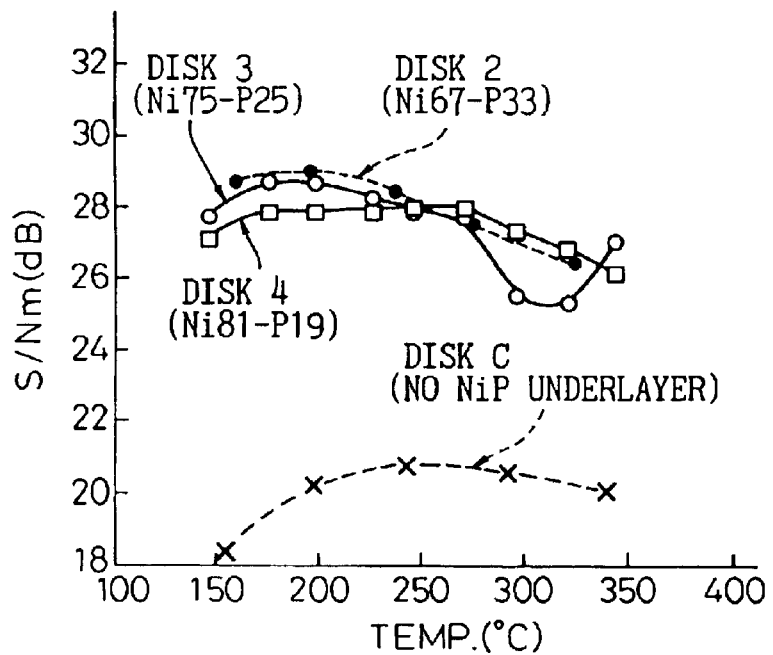
FIG. 12 is a graph showing a dependency of the S/Nm ratio of the magnetic recording medium upon the deposition temperature, with different disks.

(2) Dependency of S/Nm ratio of the medium upon the deposition temperature of the CrMo underlayer:

In Example 4, in all the magnetic disks, the CrMo10 (at %) underlayer was sputtered at a deposition temperature of 250° C. To ascertain any possible influence of the deposition temperature on the underlying NiP underlayer and thus a S/Nm ratio of the resulting medium, each magnetic disk was produced by repeating the procedure of Example 4 with the proviso that the CrMo10 underlayer was sputtered at different deposition temperatures of from 150° C. to 350° C., followed by determination of a S/Nm ratio of the medium. The results plotted in FIG. 12, i.e., a graph showing a dependency of the S/Nm ratio of the magnetic disk upon the deposition temperature, indicate that when the NiP underlayer is additionally inserted into the underlayer structure according to the present invention, a S/Nm ratio of the medium can be improved, and such improvement is attainable without depending upon the deposition temperature of the CrMo10 underlayer.

Figure 13:
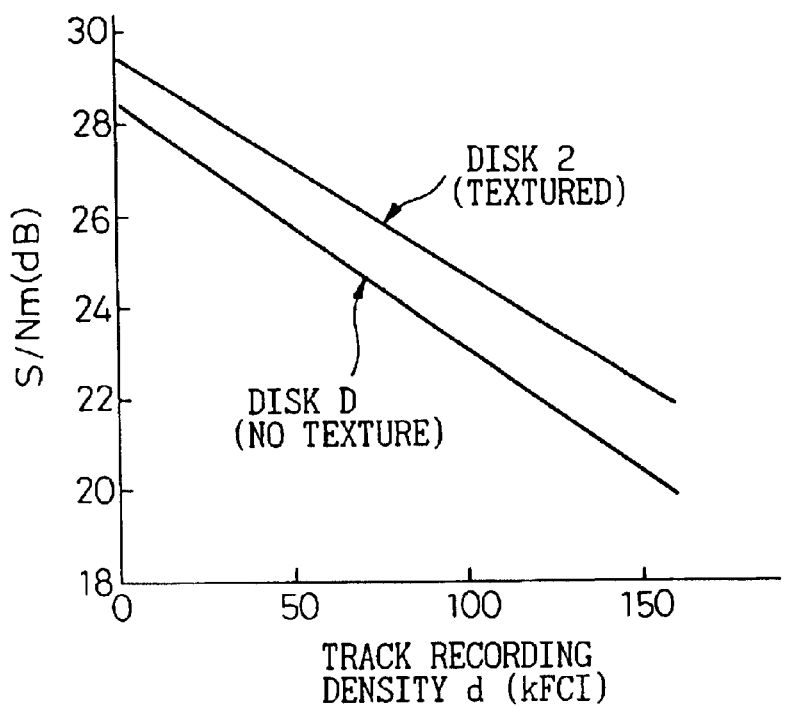
FIG. 13 is a graph showing a-dependency of the S/Nm ratio of the magnetic recording medium upon the track recording density d, with the textured and untextured disks.

(3) Dependency of S/Nm ratio of the medium upon texturing of the NiP underlayer:

In Example 4, in all the magnetic disks 2 to 4, a surface of the NiP underlayer was textured in accordance with the described texturing process. To ascertain any possible influence of the texturing on a S/Nm ratio of the resulting medium, a comparative magnetic disk D which is identical with the magnetic disk 2 except for the omission of texturing was produced by repeating the procedure of Example 4, followed by determination of a S/Nm ratio of the medium. The comparison of the S/Nm ratio between the magnetic disk 2 and the magnetic disk D was made to obtain the results plotted in FIG. 13, i.e., graph showing a dependency of the S/Nm ratio of the magnetic disks upon the track recording density d. The results of FIG. 13 indicate that the application of texturing to a surface of the NiP underlayer according to the present invention is effective to further increase a S/Nm ratio of the medium in comparison with the corresponding NiP underlayer having no texturing.

(4) Dependency of increase of the S/N ratio upon the Cr concentration of the magnetic layer:

In the above evaluation test (3), both the magnetic disks 2 and D had a magnetic layer of the composition: $Co_{72}Cr_{19}Pt_5Ta_2Nb_2$. In this test, to ascertain any possible influence of the Cr concentration of the magnetic layer on an increase of the S/Nm ratio, the procedure of Example 4 was repeated to produce the magnetic disks 2 and D having different Cr concentrations in the CoCrPtTaNb-based magnetic layer, followed by the above evaluation test (3). As a result, it has been found that a S/Nm ratio can be remarkably increased at a higher Cr concentration, and the Cr concentration in the magnetic layer should be at least 14 at % to attain a satisfactory increase of the S/Nm ratio. This is considered to be because a higher Cr concentration allows easy orientation of a C-axis of the Co (hcp) layer toward a perpendicular direction, and also the NiP underlayer can effectively act to further orient the C-axis toward an areal direction.

(5) Dependency of the residual magnetic flux density Br upon the Cr concentration of the magnetic layer:

To ascertain any variation of the residual magnetic flux density Br with change of the Cr concentration of the magnetic layer, the procedure of Example 4 was repeated to produce the magnetic disk 2 with the proviso that the Cr concentration in the CoCrPtTaNb-based magnetic layer was varied as in the evaluation test described above referring to FIG. 9, followed by determination of the Br value. Results which were substantially identical to those plotted in FIG. 9 were obtained. That is, the results indicate that the Br value can be linearly reduced with increase of the Cr content, and, to obtain a Br value of around 1,000G which is a standard for the desired residual magnetization, the Cr content is desirably 22 at % or less.

(6) Dependency of Siso/Nm of the isolated wave in the medium upon the Cr concentration in the magnetic layer:

The magnetic disks 2 having different Cr concentrations in the CoCrPtTaNb-based magnetic layer were produced, and a variation of the Siso/Nm value of the medium was determined at different Cr concentrations. Results which are substantially identical to those plotted in FIG. 10 were obtained. That is, the results indicate that the Siso/Nm value is increased with increase of the Cr content, and the Cr content of at least 14 at % is required to satisfy the desired level, i.e., Siso/Nm of 20 dB, at the lead width of 1 μm.

(7) Dependency of Siso/Nm of the isolated wave in the medium upon the tBr value:

The magnetic disks 2 having different tBr values in the CoCrPtTaNb-based magnetic layer were produced, and a variation of the Siso/Nm value of the medium was determined at different tBr values. Results which are substantially identical to those plotted in FIG. 11 were obtained. The results indicate that the tBr value of not more than 180 G.μm is required to satisfy the desired level, i.e., Siso/Nm of 16 dB.

(8) Other evaluation tests:

In addition to the above-described evaluation tests, the magnetic disks 2 to 4 having different Pt concentrations in the CoCrPtTaNb-based magnetic layer were produced, and a variation of the magnetic characteristics of the medium was determined at different Pt concentrations. As a result, it has been found that satisfactory magnetic characteristics comparable to those of the above tests could be obtained at the Pt concentration in the range of 4 to 10 at %.

Similar evaluation tests were further made with regard to the magnetic disks 2 to 4 having different Ta and Nb concentrations in the CoCrPtTaNb-based magnetic layer. As a result, it has been found that satisfactory magnetic characteristics comparable to those of the above tests could be obtained at a total of the Ta and Nb concentrations in the range of 1 to 5 at %, and the best S/N ratio could be obtained when Ta and Nb each is contained in the range of 1.5 to 2 at %.

Furthermore, it has been found that in the formation of the CoCrPtTaNb-based magnetic layer with sputtering, satisfactory magnetic characteristics comparable to those of the above tests could be obtained when the sputtering temperature is in the range of 150 to 350° C.

Example 6

The procedure of Example 1 was repeated to produce the magnetic disk according to the present invention with the proviso that in this example, a low resistance silicon substrate was used in place of the glass substrate, the NiP underlayer was sputtered at a thickness of 50 nm, followed by texturing, the CrMo underlayer was sputtered at a thickness of 25 nm, a CoCrPtTa-based magnetic layer having the composition: $Co_{77}Cr_{15}Pt_4Ta_4$ was sputtered at a thickness of 20 nm in place of the CoCrPtTaNb-based magnetic, and a carbon (C) protective layer was sputtered at a thickness of 6 nm.

The above procedure was further repeated to produce a comparative magnetic disk which is identical with the above magnetic disk of the present invention except for the omission of the NiP underlayer.

The resulting magnetic disks were subjected to the evaluation tests in accordance with the manner described in Examples 2 and 5. The following results were obtained for the magnetic disks of the present invention:

Hc:2,300 Oe

S:06

S*:0.8

Further, it has been confirmed that a Siso/Nm value of the magnetic disk of the present invention is 28 dB which is about 8 dB higher than that of the comparative magnetic disk having no NiP underlayer.

Example 7

The procedure of Example 1 was repeated to produce the magnetic disk according to the present invention with the proviso that in this example, a CrMo10 (at %) underlayer was sputtered at a thickness of 10 nm on the well-cleaned glass substrate in place of the Cr underlayer, followed by sputtering a Nip underlayer at a thickness of 100 nm. A surface of the NiP underlayer was textured to obtain an average surface roughness in a radial direction of 11 Å.

After texturing, a Cr underlayer at a thickness of 25 nm, a CoCrPtTa-based magnetic layer of the composition: $Co_{77}Cr_{15}Pt_4Ta_4$ at a thickness of 28 nm and a carbon (C) protective layer at a thickness of 9 nm were sputtered at the above order, and finally a fluorocarbon resin-based lubricant layer was applied at a thickness of 16 Å to a surface of the resulting magnetic disk.

In comparison with the conventional magnetic disk having the layer structure similar to that of the above magnetic disk except for use of an aluminum substrate, it has been found that the magnetic disk of the present invention has the same surface configurations and frictional properties as the conventional magnetic disk. Further, a gap height of 10.2 Å could be realized when the magnetic disk was used in the magnetic disk device provided with a SFS head. The initial friction coefficient was determined to be 0.33.

Furthermore, to evaluate an impact strength of the magnetic disk, the magnetic disks having a NiP underlayer of different thickness were produced in accordance with the above-described manner, and their impact strength was determined in a pendulm impact testing machine. As a result, it has been found that an impact strength comparable to that of the glass substrate could be obtained when the NiP underlayer has a thickness of not more than 500 nm. It has been also found that the impact strength does not vary even if additional element such as Mo is incorporated into the overlying Cr layer as the underlayer.

What is claimed is:

1. A magnetic recording disk comprising a nonmagnetic glass substrate having non-oriented irregularities on a surface thereof, and, having applied thereon in the following order:
   an underlayer which comprises a first underlayer consisting of chromium and having a thickness of 5 to 25 nm, a second sputtered underlayer consisting of nickel and phosphorus and a third underlayer consisting of chromium and molybdenum which are formed in the described order,
   wherein said second underlayer has a thickness of not less than 5 nm, contains P in the concentration of 15 to 33 atom % in the NiP layer and has a mechanically textured structure having a surface roughness $Ra_2$ in a radial direction of less than 2 nm, and said third underlayer has a thickness of not more than 60 nm and has a widened lattice spacing approaching the lattice spacing of a magnetic recording layer formed thereon,
   a magnetic recording layer which has a circumferential direction of easy magnetization and contains cobalt as a principal component thereof, and also contains chromium in an amount of at least 14 at % and platinum in an amount of at least 4 at % in combination with tantalum or tantalum and niobium, and
   a Hc ratio of a perpendicular coercive force Hc ⊥ to a horizontal coercive force Hc // is not more than 0.22.

2. The magnetic recording disk according to claim 1, in which said second underlayer has circumferentially distributed stripe-like ridges and grooves on a surface thereof.

3. The magnetic recording disk according to claim 2, in which said second underlayer has a surface roughness $Ra_1$ in a circumferential direction of less than 1 nm and a surface roughness $Ra_2$ in a radial direction of less than 2 nm, and the roughness $Ra_1$ is smaller than the roughness $Ra_2$.

4. The magnetic recording disk according to claim 1, in which said magnetic recording layer is constituted from a four-component metal alloy of cobalt, chromium, platinum and tantalum which is represented by the following formula:

$$Co_{bal.}\text{—}Cr_{14-22}\text{—}Pt_{4-10}\text{—}Ta_x$$

in which
   bal. means a balance calculated by subtracting the sum of the atom % of the other elements from 100, and
   x is in the range of 1 to 5 at %.

5. The magnetic recording disk according to claim 1, in which said magnetic recording layer is constituted from a five-component metal alloy of cobalt, chromium, platinum, tantalum and niobium which is represented by the following formula:

$$Co_{bal.}\text{—}Cr_{14-22}\text{—}Pt_{4-10}\text{—}Ta_x\text{—}Nb_y$$

in which
   bal. means a balance calculated by subtracting the sum of the atom % of the other elements from 100, and
   the sum of x and y (x+y) is in the range of 1 to 5 at %.

6. The magnetic recording disk according to claim 5, in which an amount of the added tantalum and that of the added niobium in the five-component alloy are exactly or substantially the same as each other.

7. The magnetic recording disk according to claim 1, in which said magnetic recording layer has a tBr value (product of a layer thickness t of the magnetic recording layer and its residual magnetic flux density Br) of 40 to 180 G.μm.

8. The magnetic recording disk according to claim 1, in which a thickness of the first underlayer is in the range of 5 to 25 nm, a thickness of the second underlayer is in the range of 10 to 200 nm, and a thickness of the third underlayer is in the range of 5 to 60 nm.

9. The magnetic recording disk according to claim 1, which further comprises, applied over said magnetic recording layer, a protective layer consisting of carbon or diamondlike carbon.

* * * * *